United States Patent
Friedman et al.

(10) Patent No.: US 11,301,408 B1
(45) Date of Patent: Apr. 12, 2022

(54) ASYMMETRIC READ / WRITE ARCHITECTURE FOR ENHANCED THROUGHPUT AND REDUCED LATENCY

(71) Applicant: Liquid-Markets-Holdings, Incorporated, Rockland, DE (US)

(72) Inventors: Seth Gregory Friedman, Tokyo (JP); Alexis Nicolas Jean Gryta, Tokyo (JP); Thierry Gibralta, Tokyo (JP)

(73) Assignee: Liquid-Markets-Holdings, Incorporated, Rockland, DE (US)

( * ) Notice: Subject to any disclaimer, the term of this patent is extended or adjusted under 35 U.S.C. 154(b) by 0 days.

(21) Appl. No.: 17/340,889

(22) Filed: Jun. 7, 2021

(51) Int. Cl.
*G06F 13/40* (2006.01)
*G06F 13/28* (2006.01)

(52) U.S. Cl.
CPC .......... *G06F 13/404* (2013.01); *G06F 13/28* (2013.01); *G06F 13/4018* (2013.01); *G06F 13/4059* (2013.01); *G06F 13/4072* (2013.01); *G06F 2213/0026* (2013.01); *G06F 2213/16* (2013.01); *G06F 2213/2806* (2013.01)

(58) Field of Classification Search
CPC .... G06F 13/404; G06F 13/28; G06F 13/4018; G06F 13/4059; G06F 13/4072
See application file for complete search history.

(56) References Cited

U.S. PATENT DOCUMENTS 6,185,634 B1 * 2/2001 Wilcox ................... G06F 13/28
710/26
2001/0036196 A1 * 11/2001 Blightman ............ H04L 47/193
370/465
2003/0097481 A1 * 5/2003 Richter ................... H04L 43/00
709/251
2003/0135670 A1 * 7/2003 Anderson ........... G06F 13/1668
710/22
2010/0306387 A1 * 12/2010 Ajima ..................... H04L 67/14
709/227

(Continued)

OTHER PUBLICATIONS

Intel 64 and IA-32 Architectures Optimization Reference Manual (Apr. 2012).

(Continued)

*Primary Examiner* — Phong H Dang
(74) *Attorney, Agent, or Firm* — McDonnell Boehnen Hulbert & Berghoff LLP

(57) ABSTRACT

The present disclosure relates to asymmetric read/write architectures for enhanced throughput and reduced latency. One example embodiment includes an integrated circuit. The integrated circuit includes a network interface. The integrated circuit also includes a communication bus interface. The integrated circuit is configured to establish a communication link with a processor of the host computing device over the communication bus interface, which includes mapping to memory addresses associated with the processor of the host computing device. The integrated circuit is also configured to receive payload data for transmission over the network interface in response to the processor of the host computing device writing payload data to the mapped memory addresses using one or more programmed input-outputs (PIOs). Further, the integrated circuit is configured to write payload data received over the network interface to the memory of the host computing device using direct memory access (DMA).

18 Claims, 11 Drawing Sheets

(56) References Cited

U.S. PATENT DOCUMENTS

| | | | |
|---|---|---|---|
| 2012/0151104 A1* | 6/2012 | Bratt | G06F 13/28 |
| | | | 710/26 |
| 2017/0147233 A1* | 5/2017 | De | G06F 3/0685 |
| 2017/0249079 A1* | 8/2017 | Mutha | G06F 3/064 |
| 2019/0044890 A1* | 2/2019 | Underwood | H04L 49/901 |
| 2020/0081864 A1* | 3/2020 | Roberts | G06F 15/17331 |

* cited by examiner

ASYMMETRIC READ / WRITE ARCHITECTURE FOR ENHANCED THROUGHPUT AND REDUCED LATENCY

BACKGROUND

Computing devices may communicate with one another over networks (e.g., a local area network (LAN) or the Internet). In order to perform such communication, one computing device may transmit one or more packets to another computing device (e.g., using a packet transmission protocol, such as transmission control protocol/internet protocol (TCP/IP), user datagram protocol (UDP), datagram congestion control protocol (DCCP), stream control transmission protocol (SCTP), stream control transmission protocol (SCTP), resource reservation protocol (RSVP)), or other standards-based or proprietary protocol.

Prior to transmitting such packets, a computing device may generate such packets to be sent (i.e., packetize or encapsulate). Generating the packets may include combining header information (e.g., destination information, error-checking information, etc.) with payload data. Inversely, after receiving such packets, a computing device may break down such packets (i.e., de-packetize or decapsulate) into their constituent parts (e.g., by separating header information from payload data). Further, a computing device may also produce the payload data itself (e.g., from internal memory) to be transmitted for inclusion in a packet or store payload data (e.g., in internal memory) extracted from a received packet.

In some cases, one or more of the above-mentioned processes may be performed by a computing controller configured to communicate with other devices on a network. Such a controller may be referred to as a network interface card (NIC), for example. Additionally or alternatively, one or more of the above-mentioned processes may be performed by a host computing device. The host computing device and the NIC may be communicatively coupled over a communication bus, for example.

The processes of generating packets, de-packetizing packets, producing payload data for transmission, storing received payload data, and communicating between a host computing device and the NIC may consume computational resources and, therefore, may increase latency and/or decrease throughput (the amount of data transmitted, received, or transmitted and received, in a given period of time). This may result in undesirable delays or dropped packets, especially in use-cases where latency and/or throughput are of paramount importance. While some reduced-latency solutions exist, they sacrifice throughput. Similarly, while some high-throughput solutions exist, they sacrifice latency.

SUMMARY

The specification and drawings disclose embodiments that relate to asymmetric read/write architectures for enhanced throughput and reduced latency.

In a first aspect, the disclosure describes an integrated circuit. The integrated circuit includes a network interface. The integrated circuit also includes a communication bus interface configured to be connected to a host computing device by way of a communication bus. The integrated circuit is configured to establish a communication link with a processor of the host computing device over the communication bus interface. Establishing the communication link includes mapping address registers of the communication bus interface to memory addresses associated with the processor of the host computing device. The integrated circuit is also configured to receive payload data for transmission over the network interface in response to the processor of the host computing device writing payload data to the mapped memory addresses associated with the processor of the host computing device using one or more programmed input-outputs (PIOs). Further, the integrated circuit is configured to write payload data received over the network interface to the memory of the host computing device using direct memory access (DMA). The DMA includes writing the payload data to coherent memory addresses associated with a memory of the host computing device and allocated by the processor of the host computing device.

In a second aspect, the disclosure describes a method. The method includes establishing, using an integrated circuit that includes a network interface and a communication bus interface, a communication link with a processor of a host computing device over the communication bus interface by way of a communication bus of the host computing device. Establishing the communication link includes mapping address registers of the communication bus interface to memory addresses associated with the processor of the host computing device. The method also includes receiving, by the integrated circuit, payload data for transmission over the network interface in response to the processor of the host computing device writing payload data to the mapped memory addresses of the host computing device using one or more programmed input-outputs (PIOs). Further, the method includes writing, by the integrated circuit, payload data received over the network interface to the memory of the host computing device using direct memory access (DMA). The DMA includes writing the payload data to coherent memory addresses associated with a memory of the host computing device and allocated by the processor of the host computing device.

In a third aspect, the disclosure describes a computing device. The computing device includes a memory. The computing device also includes a communication bus. Further, the computing device includes a processor configured to execute instructions stored in a non-transitory, computer-readable medium. The processor is configured to allocate coherent memory addresses associated with the memory. The processor is also configured to establish a communication link with an integrated circuit over a communication bus interface of the integrated circuit by way of the communication bus. Establishing the communication link includes mapping address registers of the communication bus interface to memory addresses associated with the process. Establishing the communication link permits the integrated circuit to write payload data received over a network interface of the integrated circuit to the memory using direct memory access (DMA) by writing the payload data to the allocated coherent memory addresses. Further, the processor is configured to write payload data for transmission over the network interface of the integrated circuit to the mapped memory addresses associated with the processor using one or more programmed input-outputs (PIOs).

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
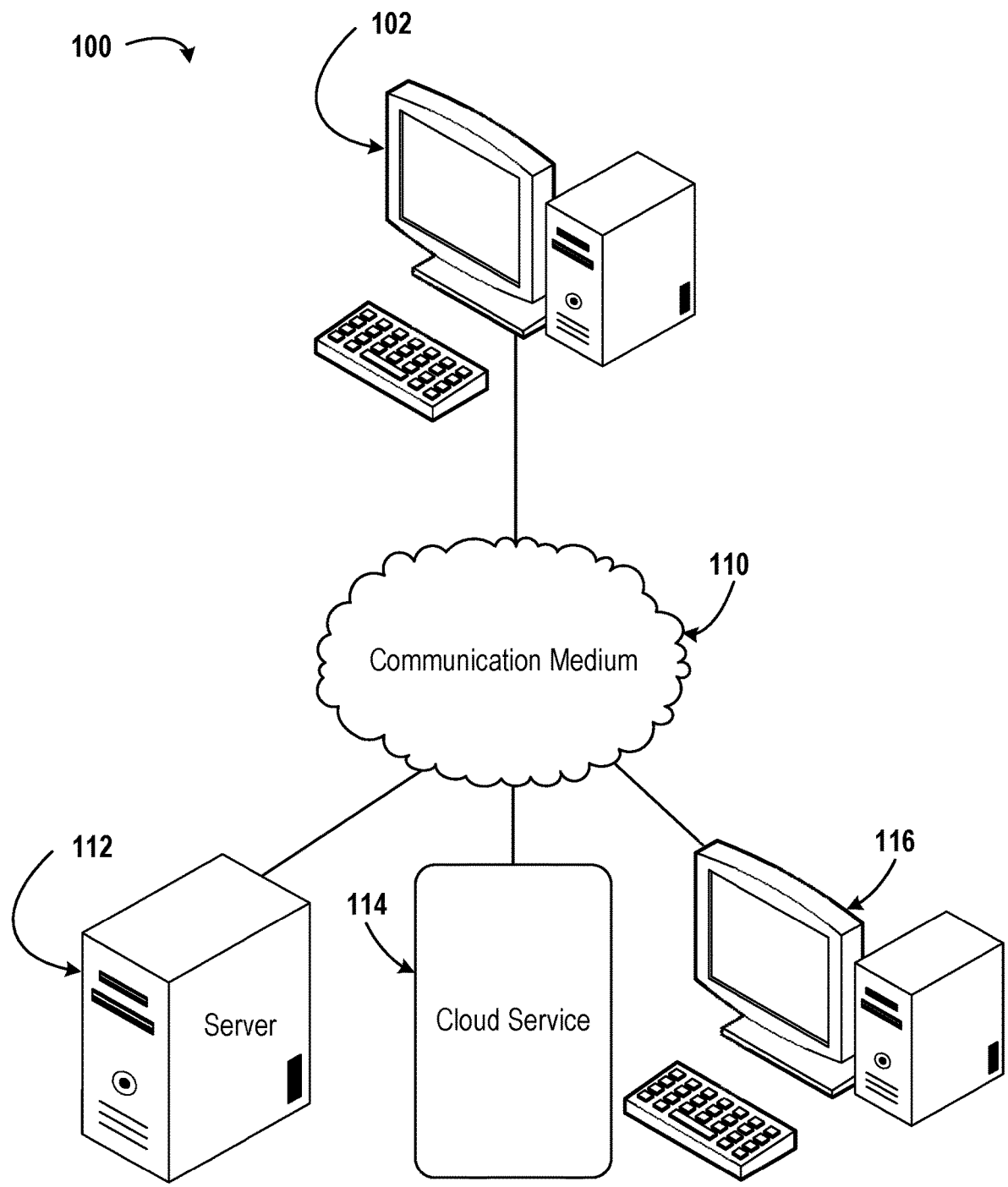
FIG. 1 illustrates a computer network, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

While the term "packet" may be used throughout this description to describe a grouping of data that may be transmitted and/or received by one or more computing devices and/or by one or more individual components of a computing device, it is understood that additional or alternative groupings of data are also contemplated herein. For example, a "packet" as described herein (e.g., a TCP/IP packet) may be encapsulated in a "frame" (e.g., an Ethernet frame). Such a frame may include a frame header and/or a frame trailer. For example, the frame may include a frame header that includes the sender's media access control (MAC) address and/or the receiver's MAC address. Additionally or alternatively, the frame may include a frame trailer that includes a frame check sequence (FCS).

I. OVERVIEW

Example embodiments relate to asymmetric read/write architectures for enhanced throughput and reduced latency.

Almost universally (i.e., in almost all potential applications), it is desirable to enhance communication speed. Enhancing communication speed may include reducing latency In other words, enhancing communication speed may include reducing the time required after transmitting a message to a device for that transmitted message to be received by the device and for a response to be generated by/sent by the device. Additionally or alternatively, enhancing communication speed may also include enhancing communication bandwidth (i.e., enhancing throughput). This may include widening a communication channel (e.g., such that more data/second can be transmitted through the communication channel) or improving the amount of data that can be transmitted by and/or received by the devices communicating.

Historically, communications between computing devices over a network involves generation and transmission of network packets. Generating, transmitting, receiving, and processing such network packets obviously takes computation time. Such computation time may result in delayed responses (e.g., increased latency) and/or in a reduction of throughput to accommodate slower devices (e.g., transmitting less data/second so a receiving device can effectively process it). Alternatively, transmitting data unrestrained to a slower device may result in the slower device buffering (queuing) received data until such time as the slower device is able to fully process the received data. This buffered data has a direct, explicit, and exponential latency penalty upon every subsequently received packet such that, for example, buffered packet #100 is subject to a processing delay equal to the total summed processing time and latency of each of packets #1 to #99 prior to packet #100 being processed. Some of the reductions in communication speed have previously been attributed to the speed at which a computing device can receive a packet/write that packet to its memory and/or the speed at which a computing device can read from its memory/generate a packet for transmission. When performing symmetric memory accesses for the above read/write processes, certain inefficiencies might only be present in one direction but can be experienced bi-directionally. For example, involving a processor as an intermediary in a write access (e.g., when a DMA could instead be performed) to maintain symmetry with a read access where a processor serves as a necessary intermediary (e.g., to determine which allocated memory addresses should be read from) can result in inefficiencies. Such inefficiencies may necessitate higher latency and/or lower throughput and may be reduced by employing asymmetrical memory access techniques for read/write accesses.

Described herein are techniques that, when compared to alternative techniques, allow for both high throughput and low latency when transmitting packets to, and receiving packets from, a network. The techniques provided herein include asymmetric forms of memory access, as well as enhancements to error-checking, to improve efficiency and eliminate certain bottlenecks in the process of transmitting and receiving packets. Alternative techniques cannot simultaneously achieve both high throughput and low latency when using symmetric read/write strategies for packets generated using/processed using a NIC and/or a host computing device. The techniques described herein use DMA on the write (receive) side and PIO on the read (transmit) side to eliminate unnecessary data writing to intermediate memory layers. These techniques thereby save additional communications over a communication interface (e.g., a peripheral component interconnect express (PCIe) interface), which improves performance (e.g., by reducing latency by the PCIe communication time, which can be ~200 ns depending on the underlying computer architecture).

Example techniques disclosed herein may be performed using one or more computing devices and/or integrated circuits. For example, a host computing device may communicate with a NIC to generate packets for transmission and/or store received packets. The host computing device may be a terminal computing device (e.g., a personal computer, a laptop computer, a mobile computing device, a tablet computing device, etc.) or a server computing device in various embodiments. Further the NIC may be permanently integrated with the host computing device (e.g., into a motherboard of the host computing device) or may be removably attached to the computing device (e.g., at an expansion slot of the motherboard of the host computing device), in various embodiments. The NIC may communicate with the host via a bus architecture such as PCIe or Point-to-Point Interconnect ("P2P"), among others.

The host computing device may include one or more processors (e.g., within one or more central processing units (CPUs)) and one or more memories (e.g., a random-access memory (RAM), one or more caches associated with the one or more processors, and/or a non-transitory, computer-readable medium, such as a hard drive). The one or more memories may store payload data from one or more packets received by the NIC and/or store payload data for later transmission by the NIC using one or more packets. In some embodiments, there may be one or more buffers (e.g., a write combining buffer, such as the line-fill buffer by INTEL) used to communicate data between memory layers within the host computing device (e.g., between a processor and a level 1 (L1) cache, between a L1 cache and a level 2 (L2) cache, between a L1 cache and volatile memory, between a L2 cache and volatile memory, or between a processor and volatile memory). Additionally or alternatively, the memories may include a set of instructions (e.g., a NIC driver), executable by the one or more processors, to interact with the NIC. Further, the one or more processors may be configured to execute instructions from a supplementary instruction set (e.g., the Streaming Single Instruction, Multiple Data Extensions 2 (SSE2) set).

The NIC may include a network interface through which the NIC can communicate with other devices on the network (e.g., other NICs, other computing devices, etc.). For example, the network interface may include an Ethernet interface and/or an Institute of Electrical and Electronics Engineers (IEEE) 802.11 standard (WIFI) interface. Further, the NIC may include one or more field-programmable gate arrays (FPGAs) to perform the functions described herein. For example, the one or more FPGAs may include memory access logic to interact with the host computing device (e.g., to store and/or retrieve payload data within one or more memories of the host computing device) and/or network stack logic to generate and/or de-packetize packets for the network.

The host computing device may also include a motherboard to which individual components are attached and, in some embodiments, by which the individual components are powered. The one or more processors and the one or more memories may be connected to the motherboard, for example. Additionally, the motherboard may include one or more communication buses. One or more of the communication buses may be used to establish a communication link between the host computing device and the NIC (e.g., PCIe bus).

One example technique for improving latency and throughput described herein includes using asymmetric read/write processes for memory access when the host computing device and the NIC are communicating. Namely, a process based on a programmed input-output (PIO) may be used to pass payload data directly from the CPU of the host computing device to the NIC (e.g., and out to the network), while a process based on direct memory access (DMA) may be used to pass payload data (e.g., received from the network) from the NIC to the memory of the host computing device without consuming any CPU instructions. Utilizing DMA to pass payload data from the NIC to the memory of the host computing device may negate an otherwise superfluous communication between the host processor and the NIC through the communication bus, thereby saving transaction time (e.g., about 200 ns). Further, using a PIO to pass payload data from the CPU of the host computing device to the NIC may allow for the utilization of one or more buffers within the host computing device, thereby leading to further optimization. In light of these benefits, this technique can achieve, for a UDP frame with a 64 byte payload, both relatively high throughput and relatively low latency (e.g., between 880 ns and 1050 ns on x86_64, INTEL64, and AMD64 processors, such as 9th generation INTEL processors, 10th generation INTEL processors, or the AMD RYZEN THREADRIPPER 3000X series of processors) when generating/transmitting packets and receiving/processing packets.

Each of the asymmetric processes referenced above will now be described in greater detail. As used herein, the "transmit side" or the "transmit process" connotes the techniques associated with the NIC reading data or otherwise receiving or retrieving data from the host computing device (e.g., payload data that is to be transmitted over the network to other devices), whereas the "receive side" or the "receive process" connotes the techniques associated with the NIC writing data or otherwise providing data to the host computing device (e.g., payload data that was received over the network from other devices).

Before performing either the transmit process or the receive process, the processor of the host computing device may establish a communication link with the NIC. Establishing the communication link may include configuring a communication bus (e.g., PCIe bus) over which the NIC and the host computing device can communicate. Configuring the communication bus may include powering the communication bus and/or mapping bus address registers (BARs) of the communication bus to one or more virtual memory addresses associated with a kernel of the host computing device. The memory may be mapped using a write-combining flag. Further, the memory may be mapped such that a write combining buffer (e.g., a line-fill buffer) is used during transfer of the payload data. Whether the write combining buffer Thereafter, the processor of the host computing device may write the payload data (e.g., originating from a register, cache, or host memory) to the BARs of the communication bus so that the payload data can be read by the NIC. This payload data may be received by the NIC over PCIe as one or more transaction layer packets (TLPs). In some embodiments, the processor may determine an array of address spaces corresponding to the payload data. This array of address spaces may be transmitted to the NIC along with the payload data, such that the NIC can reorder the payload data, if necessary, into the proper order (e.g., prior to transmission to one or more networked computing devices in a network packet). In some embodiments, the processor of the host computing device may write the payload data to the write combining buffer using a ring-buffer structure based on the array of address spaces. Still further, the processor of the host computing device may write the payload data to the write combining buffer using a store instruction (e.g., a store instruction of the SSE2 instruction set).

On the receive side, the processor of the host computing device may allocate memory (e.g., coherent memory within the host's volatile memory) that can be written to by the NIC using DMA. The memory may be allocated by the processor by executing instructions of a driver associated with the NIC (e.g., stored within a memory of the host computing device). In response to obtaining payload data (e.g., from a network packet) to be written to the host memory, the NIC may write payload data to the allocated memory addresses of the host memory via the BARs of the communication bus (i.e., DMA may be performed to write to the host memory).

In order to access the payload data stored at the allocated memory addresses in the host memory, the processor of the host computing device may periodically poll a first memory address of the allocated addresses (e.g., according to a function defined within a library stored within the host memory). If the first allocated memory address is empty (e.g., has been cleared, contains only placeholder character(s), contains all zeroes, has an associated flag indicated that the address does not contain data, etc.), the processor may determine that no payload data has been written by the NIC to the host memory. If, however, the first allocated memory address is full (or, in some embodiments, has changed since the last polling), the processor may determine that new payload data has been written by the NIC to the host memory and the processor may retrieve the payload data from subsequent allocated memory addresses (e.g., again according to a function defined within a library stored within the host memory). In some embodiments, the processor may use a fixed-size buffer to read from the allocated memory addresses. Alternatively, the first allocated memory address may contain header information regarding the size of the payload data. In such embodiments, the processor may use a variable-sized buffer to read the payload information from the subsequent allocated memory addresses and may determine the size of the variable-sized buffer based on the header information stored in the first allocated memory address.

The improvements to latency and throughput described above may be augmented by a further improvement to packet generation prior to transmitting a packet over the network and/or a further improvement to de-packetizing packets received over the network. While such improvements may further enhance transmissions/receptions of packets performed using the NIC, it is understood that such network packet techniques provide independent improvements that may be performed independent of the asymmetric DMA/PIO memory access described above. Hence, these network packet techniques may, in some embodiments, be employed without use of the host memory access techniques described above and may still, nonetheless, provide enhanced throughput/reduced latency for a computing device.

Packets transmitted by and/or packets received by the NIC may include a TCP checksum (e.g., based on TCP/IP) used to identify transmission errors. This checksum may include a header portion that corresponds to the network aspects of the packet (e.g., packet origin and/or packet destination) and a payload portion that corresponds to the payload aspects of the packet (e.g., length of payload data and/or content of payload data). These portions may be calculated independently and later combined and/or may be validated independently, in some embodiments.

On the transmit side, network stack logic (e.g., within the NIC) may provide that the NIC is to receive a payload portion of the TCP checksum from the host computing device, the NIC is to calculate the header portion of the TCP checksum independently, the NIC is to combine the payload portion of the TCP checksum with the header portion of the TCP checksum to generate the complete TCP checksum, and the NIC is to combine payload data with the complete TCP checksum to generate a complete TCP/IP packet (e.g., that can be transmitted to network computing devices using the network interface). In such embodiments, because the payload portion and the header portion of the TCP checksum are generated independently, they can be generated simultaneously or at different times. For example, to conserve resources and improve latency/throughput, the host computing device may generate the payload portion of the TCP checksum while transmitting the payload data to the NIC (e.g., by writing to the write combining buffer). Further, the NIC can generate the header portion of the checksum while receiving the payload data. Because these processes can happen in parallel, the total time to complete these processes may be reduced. Thereafter, as described above, the header portion of the checksum, the payload portion of the checksum, and the payload data may be combined to form the TCP/IP packet. The header portion of the checksum and the payload portion of the checksum may be readily combined due to the fact that the checksum is a straightforward calculation (e.g., based on one's complement arithmetic) based on a linear function (i.e., checksum(A)+checksum(B)=checksum (A+B)). As such, the checksum can be calculated incrementally without requiring any additional overhead calculations to unify the checksum calculations downstream.

On the receive side, the network stack logic may provide further improvements for handling TCP/IP packets. For example, the NIC (e.g., according to the network stack logic) may separate received packets into payload data and error-checking information (e.g., one or more checksums). By separating the packet into the payload data and error-checking information, those two entities can be handled separately and simultaneously (e.g., in parallel). For example, the NIC may begin writing the payload data to the host memory using DMA (e.g., using the BARs of the communication bus, as described above) while separately processing the error-checking information (e.g., performing the checksum function to determine a checksum based on the error-checking information). Thereafter, the calculated checksum may be transmitted to the host computing device (e.g., the host processor). If the checksum would serve to invalidate the packet, the host computing device may simply disregard and/or delete the payload data associated with the packet. However, if the determined checksum yields a valid result, the host computing device (e.g., a processor of the host computing device) may access/use the payload data. In the case where the checksum was valid, the transfer of the payload data from the NIC to the host computing device may have been accelerated by processing the error-checking information in parallel to writing the payload data to the host memory.

II. EXAMPLE SYSTEMS

The following description and accompanying drawings will describe features of various example embodiments. The embodiments provided are by way of example, and are not intended to be limiting. As such, the dimensions of the drawings are not necessarily to scale.

FIG. 1 illustrates a computing network 100, according to example embodiments. The computing network 100 may include a computing system 102. The computing network 100 may also include a server 112, a cloud service 114, and/or another computing system 116. The computing system 102 may be communicatively coupled to other components of the computing network (e.g., the server 112, the cloud service 114, and/or the other computing system 116)

via a communication medium 110. Additionally, one or more of the other components (e.g., the server 112, the cloud service 114, and/or the other computing system 116) may be interconnected with one another.

Figure 2:
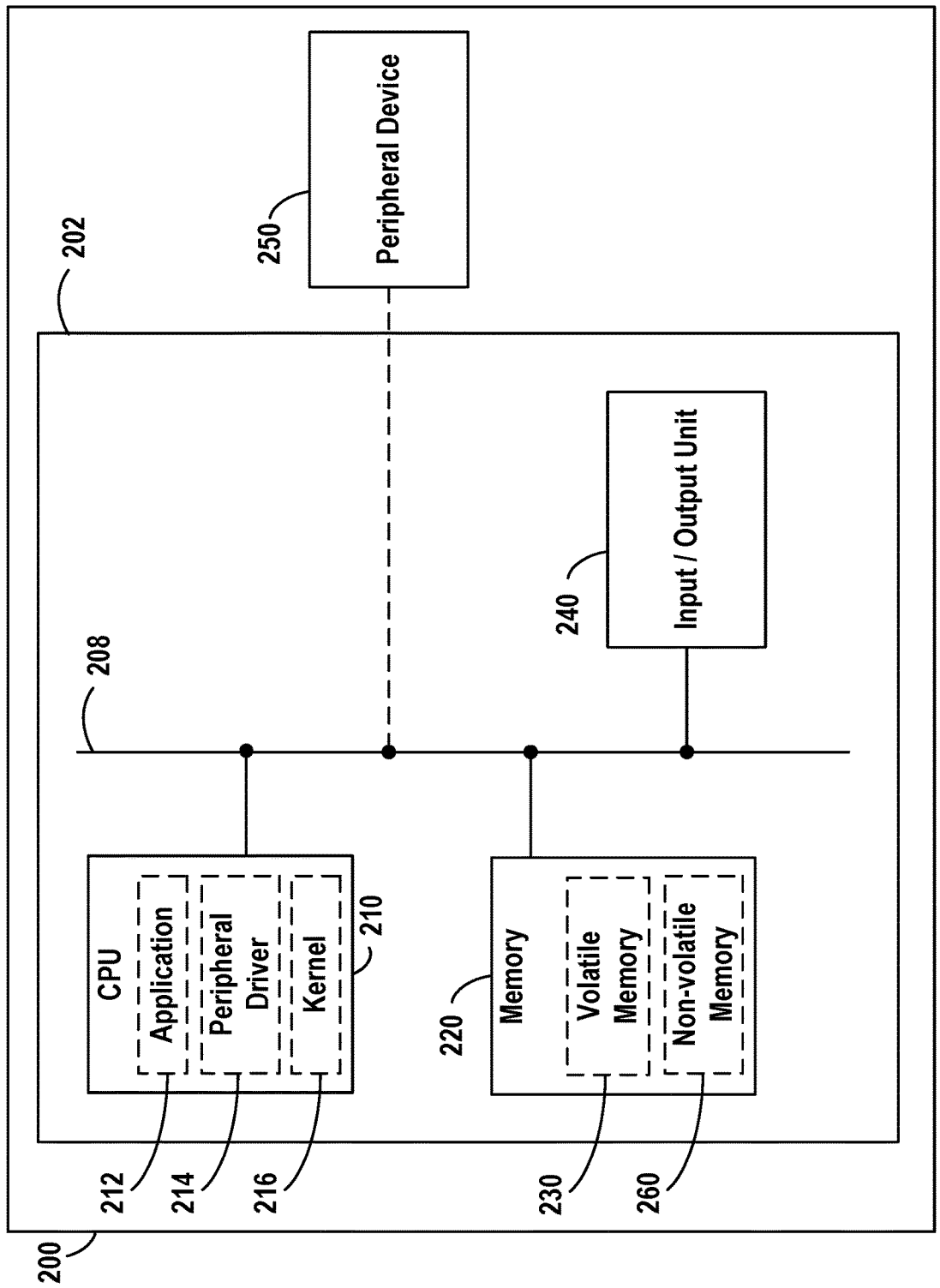
FIG. 2 illustrates a computing system, according to example embodiments.

In some embodiments, the computing system 102 may include multiple components (e.g., internal computing components), as illustrated in FIG. 2. Additional or alternative components to those illustrated in FIG. 2 are also contemplated herein. Likewise, server 112, the cloud service 114, and/or the other computing system 116 may also include one or more computing components (e.g., the same or different computing components than the computing system 102). As illustrated, the computing system 102 may correspond to a terminal device (e.g., a personal computer). Other example terminal devices are also possible and contemplated herein. For example, the computing system 102 could also include a laptop computing device, a tablet computing device, a mobile computing device, a rack-mounted server device, etc.

The server 112 may correspond to an Internet-based computing system used to store and/or process data. For example, the computing system 102 may transmit information to the server 112 via the communication medium 110 so that that the server 112 may store the data for later access (e.g., for data redundancy in case the local copy on the computing system 102 is destroyed, lost, or corrupted). Additionally or alternatively, the computing system 102 may transmit data to the server 112 so that the server 112 can process the data (e.g., can perform operations on the data and/or make determinations based on the data).

The cloud service 114 may be a subscription service associated with one or more cloud servers (e.g., remote servers other than the server 112). For example, the cloud service 114 may include instructions stored within memories of multiple cloud servers and executed by processors of the multiple cloud servers. Such instructions may, when executed, allow devices (e.g., the computing system 102) to communicate with the cloud servers to store data in and retrieve data from the cloud servers. In some embodiments, the computing system 102 may have credentials (e.g., a user identification, ID, as well as an associated password) used to authenticate the computing system 102 within the cloud service 114. In various embodiments, the cloud service 114 may be located on a public cloud or a private cloud. For example, in some embodiments, the cloud service 114 may be implemented using MICROSOFT® AZURE® or CITRIX® XENSERVER®.

In some embodiments, for example, the communication medium 110 may include one or more of the following: the public Internet, a wide-area network (WAN), a local area network (LAN), a wired network (e.g., implemented using Ethernet), and a wireless network (e.g., implemented using WIFI). In order to communicate over the communication medium 110, one or more of the components in the computing network 100 may use one or more communication protocols, such as TCP/IP or UDP.

FIG. 2 illustrates a computing system 200, according to example embodiments. The computing system 200 illustrated in FIG. 2 may be the computing system 102 illustrated in FIG. 1, for example. The computing system 200 may include a computing device 202 connected to one or more peripheral devices 250. Further, the computing device 202 may include a CPU 210, a memory 220 (which may include a volatile memory 230 and/or a non-volatile memory 260, such as a non-transitory, computer-readable medium that could be used as a storage device), and an input/output unit 240, all of which may be coupled by a system bus 208 or a similar mechanism. The system bus 208 may include a SATA bus/connection, a PCIe bus/connection, and/or a parallel advanced technology attachment (PATA, also known as integrated drive electronics, IDE) bus/connection. In some embodiments (illustrated by the dotted line), the input/output unit 240 may communicate with a peripheral device 250 (e.g., a NIC connected to the computing device 202 using a PCIe bus of the system bus 208).

The CPU 210 may execute instructions stored on a non-transitory, computer-readable medium. Such instructions may be stored within the memory 220 (e.g., within the non-volatile memory 260). Further, as illustrated, the instructions may be executed by the CPU 210 to perform functions associated with an application 212, a peripheral driver 214, or a kernel 216 (e.g., an operating system kernel). The CPU 210 may include one or more processors, such as one or more general purpose processors and/or one or more dedicated processors (e.g., application specific integrated circuits (ASICs), digital signal processors (DSPs), or graphics processing units (GPUs)). In some embodiments, the CPU 210 may include onboard volatile memory (e.g., an L1 cache, an L2 cache, etc.). In some embodiments, the CPU 210 may include one or more associated command sets that can be used (e.g., within the application 212 or the peripheral driver 214) to perform functions using the CPU 210. For example, the CPU 210 may include supplementary instruction sets (e.g., the SSE2 set).

The application 212 may be an application running in conjunction with an operating system of the computing system 200. Further, the application 212 may provide a GUI on a display for user interaction, in some embodiments. Alternatively, in some embodiments, the application 212 may be fully automated requiring no human orchestration, supervision, or interaction. In addition, the application 212 may be described by instructions stored within the memory 220 (e.g., within the volatile memory 230 and/or the non-volatile memory 260).

The peripheral driver 214 may allow the CPU 210 to interact with the peripheral device 250. For example, the peripheral driver 214 may be used by the application 212, directly or by way of the operating system, to send commands to and/or receive data from the peripheral device 250. In addition, the application 212 may be described by instructions stored within the memory 220 (e.g., within the volatile memory 230 and/or the non-volatile memory 260).

The kernel 216 may be executed by the CPU 210 to schedule actions of the computing device 202. In some embodiments, the kernel 216 may correspond to at least part of an operating system that subsumes all other actions orchestrated by the CPU 210. For example, the kernel 216 may be used to schedule instructions for the peripheral device 250 that are called by the application 212 using commands defined within the peripheral driver 214.

The volatile memory 230 may provide temporary storage (e.g., for use by the CPU 210). For example, the volatile memory 230 may store data being used by the application 212. Such data may be received from a cloud computing service, server, another computing system, etc. (e.g., the additional computing system 116 illustrated in FIG. 1 over the communication medium 110). Alternatively, such data may later be transmitted to a cloud computing service, server, another computing system, etc. (e.g., the additional computing system 116 illustrated in FIG. 1 over the communication medium 110). The volatile memory 230 may, in some embodiments, have quicker read and write times than the non-volatile memory 260. For instance, the volatile memory 230 may include dynamic RAM (DRAM) (e.g., double data rate 3 synchronous DRAM (DDR3 SDRAM)).

The non-volatile memory 260 may include data storage (e.g., a non-transitory, computer-readable medium). For example, the non-volatile memory 260 may include a hard disk drive (HDD) or a solid-state drive (SSD), in various embodiments. The non-volatile memory 260 may store data as files, for example. The non-volatile memory 260 may store program instructions, executable by the CPU 210, and data that are manipulated by these instructions to carry out the various methods, processes, or functions described herein (e.g., instructions corresponding to the application 212).

The input/output unit 240 may include a user interface (e.g., an input device, such as a keyboard or a mouse, and/or an output device, such as a display/monitor). Thus, the input/output unit 240 may receive inputs from a user to control the operation of the CPU 210. The input/output unit 240 may also provide output based on the operations performed by the CPU 210 (e.g., via a light-emitting diode (LED) display, a cathode-ray tube (CRT) display, or a liquid-crystal display (LCD)).

The peripheral device 250 may be connected to the computing device 202 using the system bus 208. For example, the system bus 208 may include a PCIe interface to which the peripheral device 250 is communicatively connected. Likewise, the peripheral device 250 may communicate with the computing device 202 using PCIe protocols. Alternatively, the peripheral device 250 may be connected using a universal serial bus (USB) interface or a SATA interface and/or communicate with the computing device 202 using other protocols (e.g., Small Computer System Interface (SCSI) protocols, USB attached SCSI protocols, serial attached SCSI protocols, or SCSI parallel interface protocols).

In some embodiments, the peripheral device 250 may include a NIC. The NIC may allow the computing system 200 to communicate with other devices (e.g., over the communication medium 110 illustrated in FIG. 1 via an Ethernet interface or a WIFI interface). The peripheral device 250 may include one or more hardware components and/or software components thereon to enable the peripheral device 250 to perform specified functions. For example, the peripheral device 250 may include an FPGA configured to perform certain functions. The peripheral device 250 will be further described with reference to the following figures.

Figure 3:
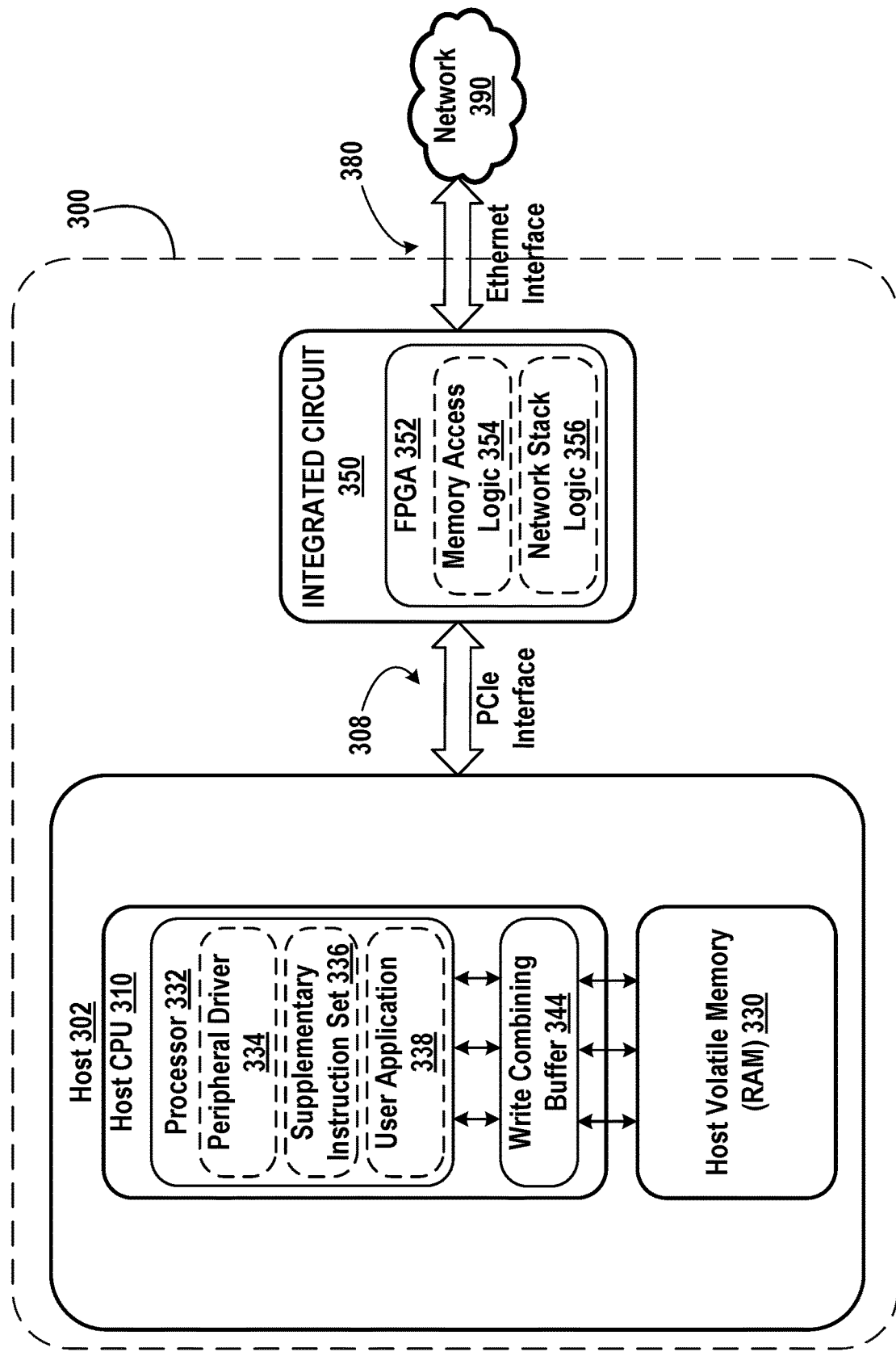
FIG. 3 is an illustration of a computing system connected to a network, according to example embodiments.

FIG. 3 is an illustration of a computing system 300 connected to a network 390 (e.g., the public Internet, a LAN, or a WAN), according to example embodiments. The computing system 300 may be similar to and/or may include the computing system 200 illustrated and described with reference to FIG. 2. As illustrated in FIG. 3, the computing system 300 may include a host computing device 302 that communicates with an integrated circuit 350 (e.g., a NIC) over a communication interface 308 (e.g., a PCIe interface). Further, the computing system 300 may communicate with a network 390 (e.g., with other computing systems on the network 390) over a network interface 380 (e.g., an Ethernet interface or a WIFI interface of the integrated circuit 350).

The host computing device 302 may include a host CPU 310 and a host volatile memory 330 (e.g., a RAM). The host CPU 310 may include a processor 332 that performs functions related to a peripheral driver 334 (e.g., a PCIe driver), a processor supplementary instruction set 336 (e.g., SSE2 instruction set), and a user application 338 (e.g., similar to the application 212 shown and described with reference to FIG. 2). The host CPU 310 may also include a write combining buffer 344 (e.g., a line-fill buffer). The arrows depicted in the host computing device 302 illustrate a flow of data between different computing units. For example, the processor 332 can transmit data to or receive data from the write combining buffer 344 and the host CPU 310 (e.g., the write combining buffer 344, specifically) can transmit data to or receive data from the host volatile memory 330. Such transmissions of data may occur over one or more communication buses (either internal to the host CPU 310 or between the host CPU 310 and other components), for example.

The host CPU 310 may be similar to the CPU 210 illustrated and described with reference to FIG. 2. For example, the processor 332 may include a general purpose processor and/or a dedicated processor. Also like the CPU 210, the processor 332 may, in addition to the peripheral driver 334 and the supplementary instruction set 336, perform functions that correspond to one or more applications and/or one or more kernels. In order to perform the functions related to the peripheral driver 334, the functions related to the supplementary instruction set 336, and/or other functions (e.g., related to a kernel, such as the kernel 216 shown and described with reference to FIG. 2), the processor 332 may execute a set of instructions (e.g., stored within a non-transitory, computer-readable medium).

The peripheral driver 334 may include an instruction set (e.g., stored within a non-volatile or volatile memory of the host computing device 302 and/or within a memory of a peripheral, such as the integrated circuit 350) that is executed by the processor 332 to control a peripheral of the host computing device 302. For example, the peripheral driver 334 may be executed by the processor 332 to interact with the integrated circuit 350 over the communication interface 308. In some embodiments, the peripheral driver 334 may be usable by the processor 332 to establish/configure a connection between the processor 332 and the integrated circuit 350. For example, the peripheral driver 334 may include a PCIe driver. Additionally or alternatively, the peripheral driver 334 may include commands that may be executable by the processor 332 that instruct a peripheral device (e.g., the integrated circuit 350) to perform certain functions. In some embodiments, the peripheral driver 334 may be stored onboard a peripheral (e.g., the integrated circuit 350) and transmitted to the host computing device 302 (e.g., for storage in a memory and/or execution by the processor 332) in response to the peripheral being connected to the host computing device 302 (e.g., in response to the integrated circuit 350 being connected to a PCIe expansion slot of a motherboard of the host computing device 302).

The supplementary instruction set 336 may include one or more commands executable by the processor 332 to carry out functions and requests issued by applications using the processor 332 (e.g., issued by the user application 338). For example, the supplementary instruction set may include support for vector operations and for double precision data types, may include cache control instructions that minimize cache pollution, and may provide additional registers. The supplementary instruction set may supplement the capabilities of the processor 332 beyond the standard instruction set (e.g., the x86 instruction set). Further, the supplementary instruction set 336 may be dependent on the type of processor used. For example, in embodiments where the host CPU 310 is an INTEL processor, the supplementary instruction set 336 may include a single instruction, multiple data (SIMD) instruction set, such as the a SSE2 instruction set.

The user application 338 may be stored within a memory of the host computing device 302 (e.g., the volatile memory 330 and/or a non-volatile memory). Further the user application 338 may be executed by the processor 332 to carry out one or more user-desired processes. For example, the user application 338 may represent a trading platform, a game, a streaming service (e.g., a music streaming service or a video streaming service), an email service, a web browser, a chat service (e.g., a video-chat service), etc. The user application 338 may include processes that involve communicating with one or more other devices and/or applications over the network 390. In addition, the user application 338 may receive inputs or provide outputs to a user of the host computing device 302 (e.g., via the input/output unit 240 as shown and described with reference to FIG. 2). Further, in some embodiments, during execution of the user application 338, one or more functions may be called. Such functions may be involve performing instructions that are described within a library of the user application 338, within the peripheral driver 334, and/or within the supplementary instruction set 336. For example, the user application 338 may include a trading platform that generates an order for transmission to a securities exchange. In response to receiving that request, the processor 332 executing the user application 338 may transmit the request to another device on the network 390 via the integrated circuit 350 using the peripheral driver 334 and the supplementary instruction set 336 based on the techniques described below with reference to FIGS. 4, 5A, and 6.

The write combining buffer 344 is a buffer that may store data that is later to be released in larger chunks (e.g., as opposed to in smaller segments). In some embodiments, for example, the write combining buffer 344 may be 64 bytes in size. Other sizes are also possible and contemplated herein. In this way, if the processor 332 performs functions with a write combining flag, data may be written to the write combining buffer 344 to be transferred to a peripheral (e.g., the integrated circuit 350) in bursts. Further, in some embodiments, data written to the write combining buffer 344 may not be guaranteed to be ordered. As such, the processor 332 may also provide metadata (e.g., header information stored in specific address spaces) to the integrated circuit 350 such that the integrated circuit 350 can reorder the data transferred via the write combining buffer 344, if necessary.

In various embodiments, depending on architecture, the write combining buffer 344 may be located between various sections of memory of the host computing device 302. For example, the write combining buffer 344 may be located between the processor 332 and a L1 cache, between a L1 cache and a L2 cache, or between a L2 cache and the volatile memory 330. The write combining buffer 344 may have different names depending on architecture, as well. For example, in an INTEL architecture, the write combining buffer 344 may be referred to as a line-fill buffer, whereas in an AMD architecture, the write combining buffer 344 may be referred to as a miss address buffer.

The host volatile memory 330 may include be similar to the volatile memory 230 shown and described with reference to FIG. 2, for example. As such, the volatile memory 230 may include one or more units of DRAM. The volatile memory 330 may store information that is accessible by the host CPU 310 to perform functions (e.g., functions related to the user application 338). Data that is stored in the host volatile memory 330 may be accessed more frequently by the processor 332 than data stored in a non-volatile fashion within a non-volatile memory (e.g., a hard drive) of the host computing device 302 (not pictured). Further, the volatile memory 330 may be connected to a non-volatile memory of the host computing device 302 over a bus to transfer data to the non-volatile memory for long-term storage.

The integrated circuit 350 may correspond to one or more printed circuit boards (PCBs) having one or more electronic components (e.g., capacitors, inductors, resistors, metal-oxide-semiconductor field-effect transistors (MOSFETs), bipolar junction transistors (BJTs), diodes, LEDs, transducers, antennas, switches, etc.) interconnected with one another using electrical traces (e.g., copper traces disposed on the PCBs). Further, the integrated circuit 350 may represent a peripheral that communicates with the host computing device 302 over the communication interface 308. For example, the integrated circuit 350 may be a NIC that is attached to a motherboard of the computing system 300 at a PCIe expansion slot and communicates with the host computing device 302 over a PCIe bus using a PCIe interface. In other embodiments, the integrated circuit 350 may alternatively be connected to/communicate with the host computing device 302 in other fashions (e.g., over a USB connection or a SATA connection). In addition to communicating with the host computing device 302 over the communication interface 308, the integrated circuit 350 may also be powered by the host computing device 302 (e.g., may receive electrical power via one or more electrical connections to a power source of the host).

As illustrated, the integrated circuit 350 may include an FPGA 352. The FPGA 352 may perform functions based on one or more types of logic. In various embodiments, such logic could be hardware logic and/or software logic (e.g., stored within a non-transitory, computer-readable medium, such as a ROM, of the FPGA 352). As also illustrated in FIG. 3, the functions performed by the FPGA 352 may correspond to memory access logic 354 and network stack logic 356. It is understood that additional or alternative types of logic are possible and are contemplated herein.

The FPGA 352 may include a controller (e.g., a processing unit) to execute one or more instructions stored within an onboard or onchip memory (e.g. a non-volatile memory, such as a ROM, or a volatile memory such as Block Random Access Memory (BRAM), Static random-access memory (SRAM), Quad Data Rate (QDR), or Double Data Rate (DDR)) of the FPGA 352. When executing the instructions, the controller may perform functions relating to the memory access logic 354 and/or the network stack logic 356, for example. The components of the FPGA 352 (e.g., the memory, the controller, the hardware logic, etc.) may be interconnected over a bus (e.g., the components may be located on a PCB and connected with metallic traces). Further, the FPGA 352 or components of the FPGA 352 (e.g., the controller) may receive power and/or information from or transmit information to the host computing device 302 via the communication interface 308 (e.g., via a PCIe bus). Likewise, the FPGA 352 or components of the FPGA 352 (e.g., the controller) may receive information from or transmit information to other devices on the network 390 via the network interface 380 (e.g., an Ethernet interface).

The memory access logic 354 may represent the functions performed by the FPGA 352 (e.g., a controller of the FPGA 352) that correspond to communications between the host computing device 302 and the integrated circuit 350. Such functions may include DMA writes to the volatile memory 330 and/or receiving data from the host computing device 302 via PIOs. Further, such functions will be further shown and described with reference to FIGS. 4-5B, for example.

The network stack logic 356 may represent the functions performed by the FPGA 352 (e.g., a controller of the FPGA 352) that correspond to the processing of data immediately prior to transmitting the data as a network packet to other devices over the network 390 or immediately after receiving the data as a network packet from other devices over the network 390. For example, the network stack logic 356 may involve generating network packets, de-packetizing network packets, and/or calculating checksums. Such functions will be further shown and described with reference to FIGS. 6 and 7.

Figure 4:
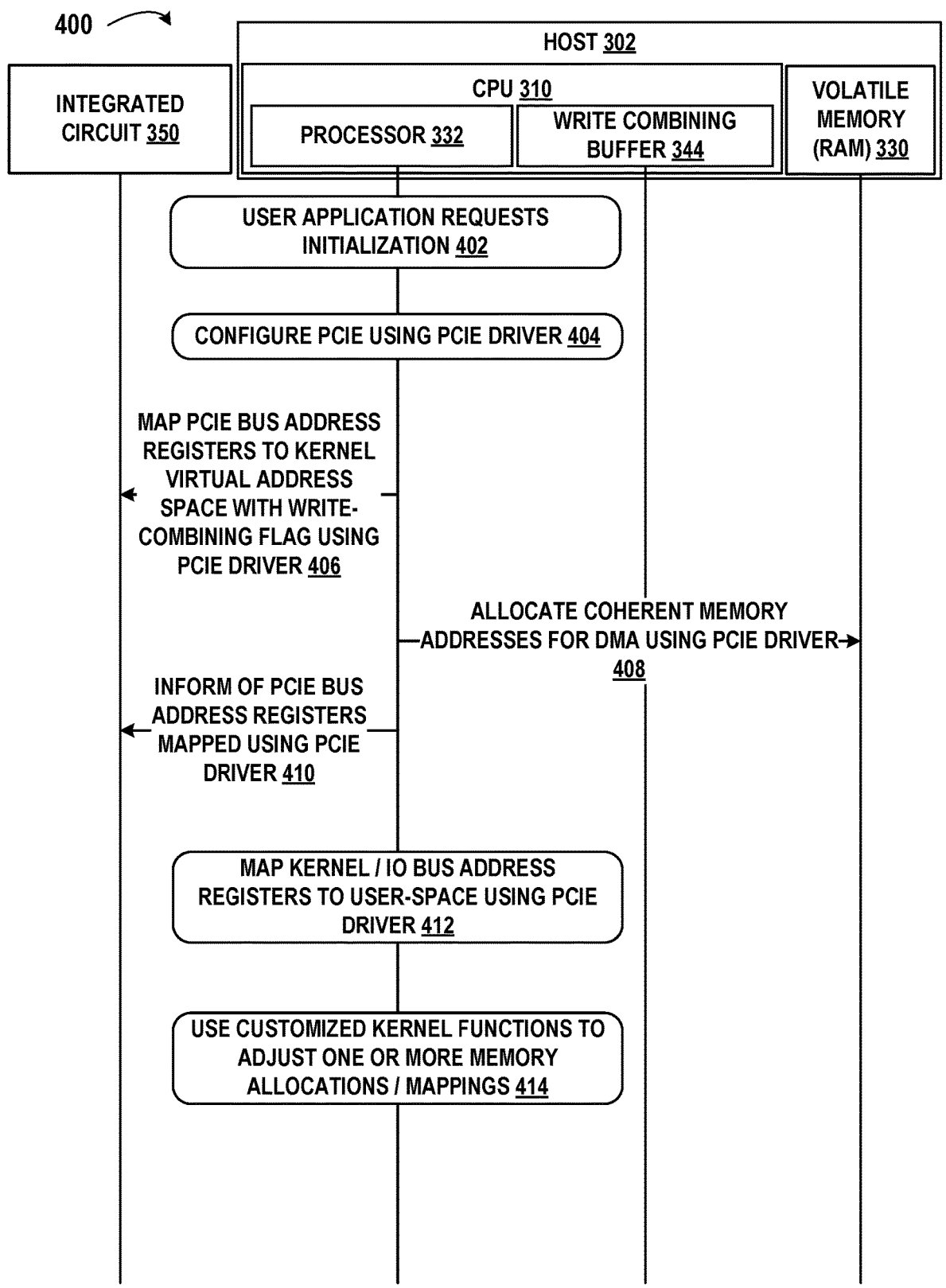
FIG. 4 is a communication flow diagram of an initialization, according to example embodiments.

FIG. 4 is a communication flow diagram of an initialization 400, according to example embodiments. As illustrated in FIG. 4, the initialization 400 may be performed, at least in part, based on communications between a host computing device (e.g., the host computing device 302 illustrated in FIG. 3) and an integrated circuit (e.g., the integrated circuit 350 illustrated in FIG. 3). Specifically, the initialization 400 may be performed based on communications between the processor 332 of the host computing device 302, the volatile memory 330 of the host computing device 302, and the integrated circuit 350 to prepare to transmit and/or receive network packets (e.g., network packets that can be transmitted/received over a network interface 380, as illustrated in FIG. 3). Such communications may involve uses of a write combining buffer (e.g., the write combining buffer 344 illustrated in FIG. 3) to enhance data transfer speed. The initialization 400 of FIG. 4 may be performed prior to a transmission of network packets or a reception of network packets. Further, if the initialization 400 has previously been performed (e.g., to prepare to transmit network packets), it may not be performed again (e.g., to prepare to receive network packets), if unnecessary. The host computing device 302 (e.g., the processor 332) and/or the integrated circuit 350 may have a flag or variable used to indicate whether the initialization 400 has been previously performed.

At step 402, the initialization 400 may include the processor 332 performing functions related to a user application (e.g., the user application 338 shown and described with reference to FIG. 3) and those functions including requesting that an initialization be performed. For example, step 402 may be performed based on a request generated in response to a request from an application programming interface (API) within the user application 338. Further, in some embodiments, in response to performing the initialization 400, a flag may be set (either in the host computing device 302 or the integrated circuit 350) to indicate that the initialization has already been performed. Based on this flag, if another request for initialization is made (e.g., based on a request from a user application 338), the host computing device 302 and/or the integrated circuit 350 will prevent another initialization from being performed and/or prevent another instance of the communication channel from being opened.

At step 404, the initialization 400 may include the processor 332 configuring a communication interface (e.g., the communication interface 308, such as a PCIe interface, shown and described with reference to FIG. 3) using a peripheral driver (e.g., the peripheral driver 334 shown and described with reference to FIG. 3).

At step 406, the initialization 400 may include the processor 332 mapping BARs of the communication bus (e.g., BARs of the PCIe bus) to virtual memory addresses within the kernel virtual address space. The BARs of the communication bus may be mapped using a write-combining flag (e.g., to enable use of the write combining buffer 344). Additionally or alternatively, the BARs of the communication bus may be mapped using a peripheral driver (e.g., the peripheral driver 334 shown and described with reference to FIG. 3). Mapping the BARs of the communication bus to the virtual memory addresses may be performed using an input-output memory management unit (IOMMU), in some embodiments.

At step 408, the initialization 400 may include the processor 332 allocating memory addresses (e.g., coherent memory addresses) of the volatile memory 330 of the host computing device 302 for DMA. This allocation may be performed using a peripheral driver (e.g., the peripheral driver 334 shown and described with reference to FIG. 3).

At step 410, the initialization 400 may include the processor 332 informing the integrated circuit 350 of the BARs of the communication bus (e.g., of the PCIe communication bus) that were previously mapped (e.g., previously mapped using the peripheral driver 334). The processor 332 may inform the integrated circuit 350 of the mapped BARs using a peripheral driver (e.g., using the peripheral driver 334 shown and described with reference to FIG. 3).

At step 412, the initialization 400 may include the processor 332 mapping the BARs used for a kernel (e.g., the kernel 216 shown and described with reference to FIG. 2) and/or the BARs used for input-output (TO) to user-space. This may sometimes be referred to as enabling a kernel bypass. By mapping the kernel BARs and/or the IO BARs to user-space, an application being executed by the processor 332 (e.g., the user application 338 shown and described with reference to FIG. 3) may be permitted to directly read/write to those BARs without accessing the kernel. In some embodiments, mapping the kernel BARs and/or the IO BARs may be performed by the processor 332 using a peripheral driver (e.g., the peripheral driver 334 shown and described with reference to FIG. 3).

At step 414, the initialization 400 may include the processor 332 using customized kernel functions to adjust one or more memory allocations, mappings, and/or settings associated with those allocations and/or mappings. In some embodiments, the customized kernel functions may include one or more functions executed by a user application using a customized kernel API calls. Further, the kernel API calls may include making modifications to: an IOMMU, a memory-management unit (MMU), a translation lookaside buffer (TLB), an allocation of coherent physical memory in a specific double data rate (DDR) dual in-line memory module (DIMM) connector (e.g., associated with the volatile memory 330 of the host computing device 302), and/or a PIO access protocol. In some embodiments, step 414 may not be performed (e.g., when no modifications to the memory allocations and/or mappings is needed).

Figure 5A:
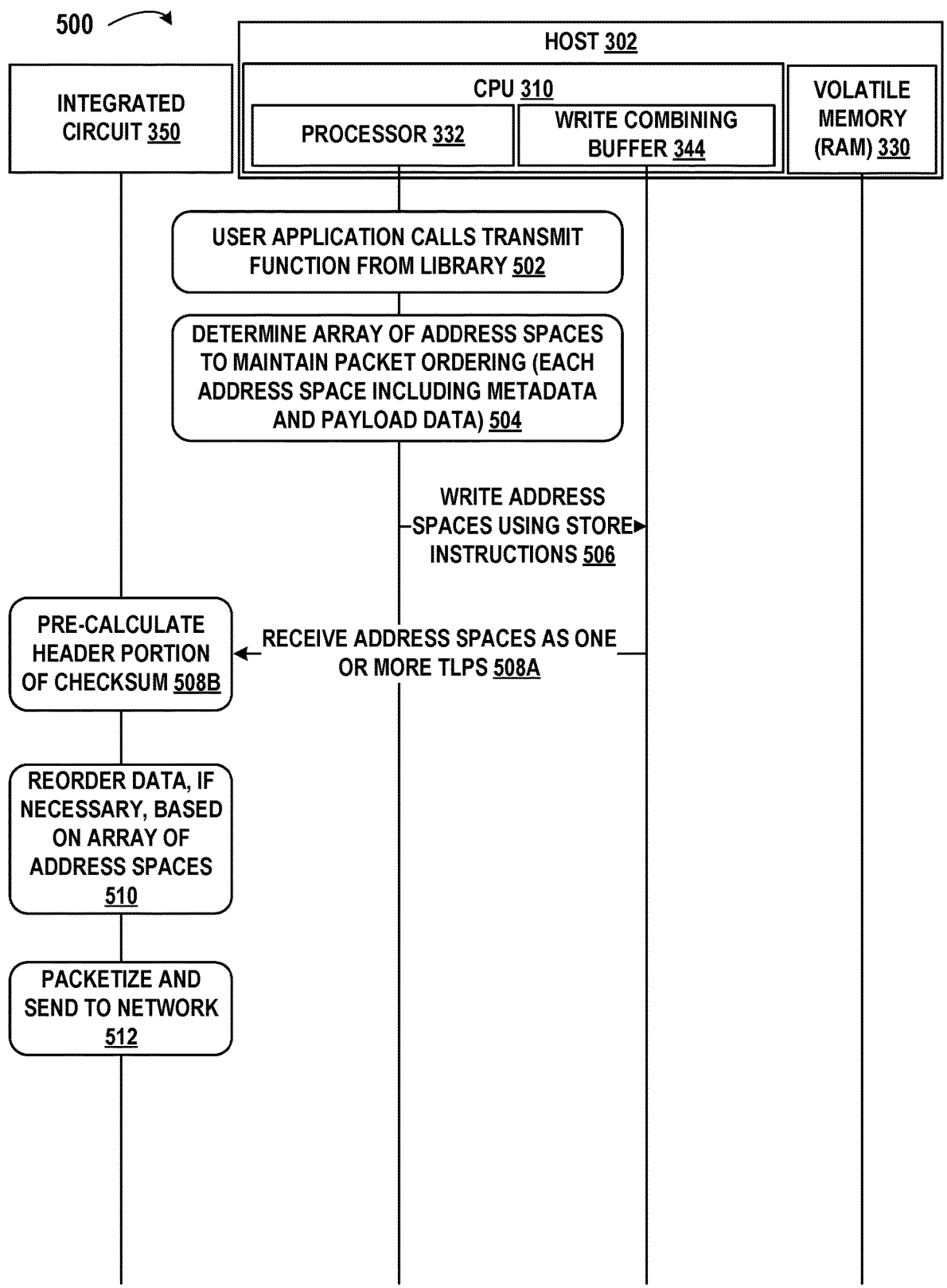
FIG. 5A is a communication flow diagram of a transmit technique, according to example embodiments.

FIG. 5A is a communication flow diagram of a transmit technique 500, according to example embodiments. The transmit technique 500 may be performed using a PIO, in some embodiments. As illustrated in FIG. 5A, the transmit technique 500 may be performed, at least in part, based on communications between a host computing device (e.g., the host computing device 302 illustrated in FIG. 3) and an integrated circuit (e.g., the integrated circuit 350 executing the memory access logic 354 as shown and described with reference to FIG. 3). Specifically, the transmit technique 500 may be performed based on communications between the processor 332 of the host computing device 302, a write combining buffer (e.g., the write combining buffer 344 illustrated and described with reference to FIG. 3) of the host computing device 302, and the integrated circuit 350 in order to generate and transmit a packet to a network (e.g., communication to the network 390 over a network interface 380, as illustrated in FIG. 3). The use of the write combining buffer 344 may enhance the rate at which payload data can be transferred from the host computing device 302 to a peripheral device (e.g., the integrated circuit 350).

At step 502, the transmit technique 500 may include a user application (e.g., the user application 338 shown and described with reference to FIG. 3) executed by the processor 332 calling a transmit function from a library (e.g., a library associated with the user application 338). The transmit function may be called to transmit data to one or more other devices on a network (e.g., the network 390 shown and described with reference to FIG. 3).

At step 504, the transmit technique 500 may include the processor 332 determining an array of address spaces. The array of address spaces may be usable to maintain packet ordering. For example, each of the address spaces within the array may include metadata/header information and payload data. The metadata/header information may be usable to reorder the payload data of each of the address spaces to generate a coherent packet of data.

At step 506, the transmit technique 500 may include the processor 332 writing address spaces (e.g., the address spaces from the array determined at step 504) to the write combining buffer 344. The address spaces, as described above, may include both header information/metadata, as well as payload data (e.g., data to be transmitted to one or more other devices on the network 390). Writing addresses spaces to the write combining buffer 344 may be performed using one or more store instructions, in some embodiments. Such store instructions may include one or more instructions from a supplementary instruction set (e.g., the supplementary instruction set 336 shown and described with reference to FIG. 3) associated with the processor 332. It is understood that instructions based on such supplementary instruction sets may be generated (or not) by the processor 332 based on the type of processor used and/or in response to the type of request made (e.g., in response to the transmit function of step 502 being called during execution of the user application 338). Hence, in various embodiments, different numbers and types of instructions may be performed by the processor 332 to write the address spaces to the write combining buffer 344. Further, in some embodiments, the processor 332 may write the address spaces to the write combining buffer 344 in a ring buffer arrangement.

Steps 502, 504, and 506 may represent a PIO. In other words, a program being executed by the processor 332 may request a data transfer (e.g., an output) to the integrated circuit 350/a network (e.g., the network 390 shown and described with reference to FIG. 3). That request may then be processed using one or more instructions corresponding to the processor 332 (e.g., store instructions). Hence, a PIO may have been performed to transfer data from the processor 332 to the integrated circuit 350.

At step 508A, the transmit technique 500 may include the integrated circuit 350 receiving address spaces (e.g., the address spaces written by the processor 332 at step 506). In some embodiments, the address spaces may be received from the write combining buffer 344, as illustrated. Further, in some embodiments, the address spaces may be received as one or more TLPs.

At step 508B, the transmit technique 500 may include the integrated circuit 350 pre-calculating a header portion of a TCP/IP packet checksum. The header portion of the checksum may be calculated based on the header information/metadata included in one or more of the address spaces. Further, the header portion of the checksum may later be combined with a payload portion of the checksum (e.g., a payload portion of the checksum that was calculated by the processor 332) to from the final TCP/IP packet checksum.

In some embodiments, one or more of the processes that occur at step 508A may occur simultaneously with or in parallel to one or more of the processes that occur at step 508B. It is understood that in various embodiments, one or all of the processes of step 508A may occur entirely before and/or entirely after all of the processes of step 508B.

At block 510, the transmit technique 500 may include the integrated circuit 350 reordering the payload data in the received address spaces, if necessary, based on the header information/metadata in the address spaces.

At block 512, the transmit technique 500 may include the integrated circuit 350 packetizing the payload data (e.g., along with the TCP/IP checksum) and transmitting it over a network (e.g., the network 390 shown and described in FIG. 3).

Figure 5B:
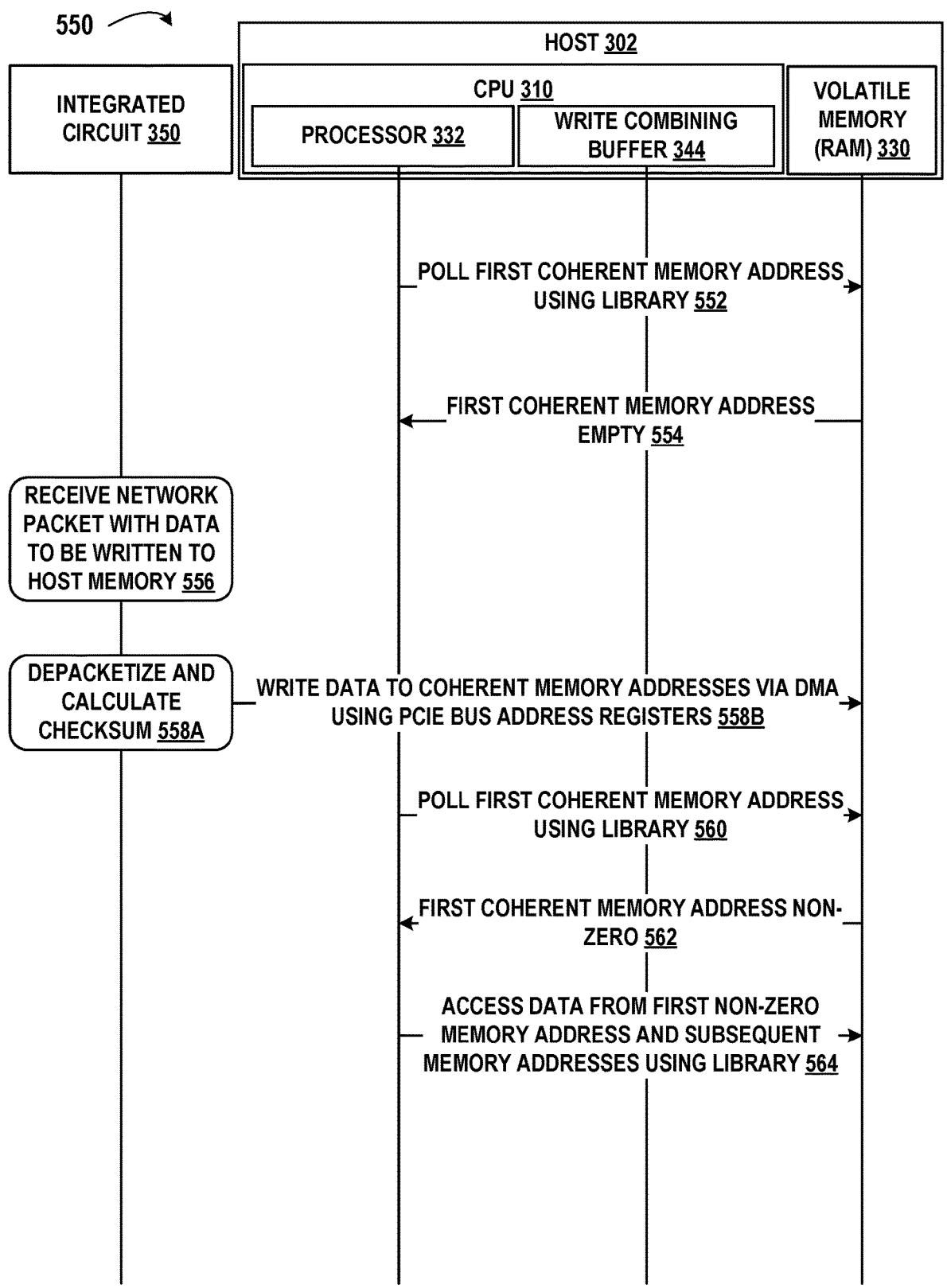
FIG. 5B is a communication flow diagram of a receive technique, according to example embodiments.

FIG. 5B is a communication flow diagram of a receive technique 550, according to example embodiments. As illustrated in FIG. 5B, the receive technique 550 may be performed, at least in part, based on communications between a host computing device (e.g., the host computing device 302 illustrated in FIG. 3) and an integrated circuit (e.g., the integrated circuit 350 executing the memory access logic 354 as shown and described with reference to FIG. 3). Specifically, the receive technique 550 may be performed based on communications between the processor 332 of the host computing device 302, the volatile memory 330 of the host computing device 302, and the integrated circuit 350 in order to receive and store a packet from a network (e.g., received from the network 390 over a network interface 380, as illustrated in FIG. 3).

At step 552, the receive technique 550 may include the processor 332 polling a first memory address (e.g., coherent memory address) of the allocated memory addresses of the volatile memory 330 of the host computing device 302 (e.g., the memory addresses that were allocated at step 408 of the initialization 400 as shown and described with reference to FIG. 4). In some embodiments, the processor 332 may perform such a polling using a library (e.g., a library of a user application, such as the user application 338 shown and described with reference to FIG. 3).

At step 554, the receive technique 550 may include the processor 332 identifying that the first memory address (e.g., coherent memory address) of the allocated memory addresses of the volatile memory 330 of the host computing device 302 is empty (e.g., does not include payload data).

The polling of step 552 may be performed periodically at predefined and/or variable polling intervals. The polling intervals may be determined by the processor 332 (e.g., set by a user during the execution of the user application 338) and/or stored within the volatile memory 330 or a non-volatile memory (e.g., hard drive) of the host computing device 302 or the integrated circuit 350. In some embodiments, for example, the integrated circuit 350 may require a predetermined amount of time to receive a network packet and write associated payload data to the volatile memory 330 of the host computing device 302. As such, the polling interval may be defined such that it is longer than that predetermined amount of time. Further, in some embodiments, the polling interval may increase or decrease (e.g., linearly, quadratically, or exponentially) in between each polling event or after a predetermined number of polling events (e.g., after every 100 polling events, the polling interval doubles).

It is understood that the polling may continue periodically and indefinitely until, unlike at step 554, the first allocated memory address is non-zero (e.g., as in step 562 described below). For example, in some cases, the first polling may result in the first allocated memory address containing data (i.e., step 554 may not occur). In other cases, two, three, four, five, six, seven, eight, nine, ten, etc. polling events may occur prior to the first allocated memory address being non-zero. The number of polling events prior to the first allocated memory address being non-zero may depend on the amount of time that expires between an initialization (e.g., the initialization 400 shown and described with reference to FIG. 4) prior to the integrated circuit 350 receiving a network packet to be written to the volatile memory 330 of the host computing device 302.

At step 556, the receive technique 550 may include the integrated circuit 350 receiving a network packet (e.g., a TCP/IP packet) from a network (e.g., the network 390 shown and described with reference to FIG. 3). The network packet may contain payload data that is ultimately to be written to the volatile memory 330 of the host computing device 302. In some embodiments, the payload data within the network packet may additionally or alternatively also eventually be written to one or more non-volatile memories associated with the host computing device 302.

At step 558A, the receive technique 550 may include the integrated circuit 350 de-packetizing the received network packet and calculating a checksum using a checksum function based on the header information of the network packet.

At step 558B, the receive technique 550 may include the integrated circuit 350 writing data from the network packet to allocated memory addresses (e.g., coherent memory addresses) of the volatile memory 330 via DMA. In some embodiments, writing the data to the allocated memory addresses via DMA may be done using one or more BARs of the communication bus (e.g., PCIe BARs). Further, the data written to the allocated memory addresses via DMA may include metadata (e.g., a header that includes the length of the data) as well as payload data.

In some embodiments, one or more of the processes that occur at step 558A may occur simultaneously with or in parallel to one or more of the processes that occur at step 558B. It is understood that in various embodiments, one or all of the processes of step 558A may occur entirely before and/or entirely after all of the processes of step 558B.

At step 560, the receive technique 550 may include the processor 332 polling a first memory address (e.g., coherent memory address) of the allocated memory addresses of the volatile memory 330 of the host computing device 302 (e.g., the memory addresses that were allocated at step 408 of the initialization 400 as shown and described with reference to FIG. 4). In some embodiments, the processor 332 may perform such a polling using a library (e.g., a library of a user application, such as the user application 338 shown and described with reference to FIG. 3). Step 560 may be substantially similar or the same as step 552, in some embodiments.

At step 562 (unlike step 554), the receive technique 550 may include the processor 332 determining that the first memory address (e.g., coherent memory address) of the allocated memory addresses of the volatile memory 330 of the host computing device 302 is non-zero (e.g., contains data).

At step 564, the receive technique 550 may include the processor 332 accessing data from the first non-zero memory address and subsequent memory addresses of the allocated memory addresses of the volatile memory 330 of the host computing device 302. Accessing data from the first non-zero memory address and subsequent memory addresses may be performed by the processor 332 using a library (e.g., a library of a user application, such as the user application 338 shown and described with reference to FIG. 3). Further, in some embodiments, the processor 332 may access the data using a fixed-size buffer. Alternatively, the processor 332 may access the data using a variable-sized buffer (e.g., that changes size based on header information stored in the first allocated memory address or based on other information received by the processor 332 from the integrated circuit 350).

Figure 6:
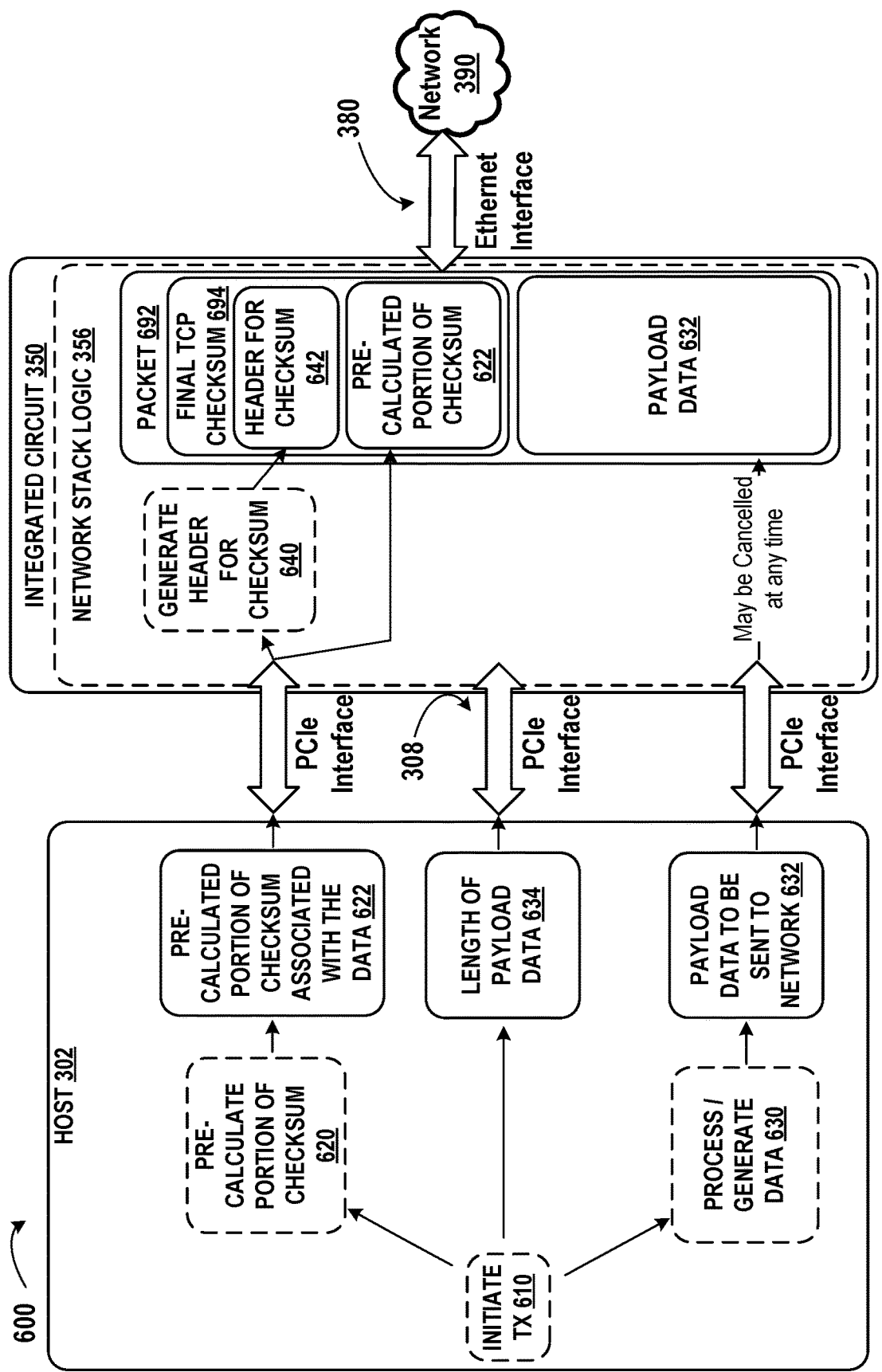
FIG. 6 is a schematic diagram illustrating a packet-generation technique that can be used when a packet is transmitted, according to example embodiments.

FIG. 6 is a schematic diagram illustrating a packet-generation technique 600 that can be used when a packet is transmitted, according to example embodiments. The packet-generation technique 600 may be used in addition to or instead of the asymmetric read/write techniques shown and described with reference to FIGS. 4-5B to improve throughput and/or reduce latency. The packet-generation technique 600 may be performed by the host computing device 302 (e.g., using the processor 332) in communication with the integrated circuit 350 (e.g., a NIC). The integrated circuit may be executing the network stack logic 356, for example. The host computing device 302 and the integrated circuit 350 may communicate over the communication interface 308 (e.g., a PCIe interface). Additionally, the integrated circuit 350 may, in response to generating the packet, transmit the packet to one or more other devices on the network 390. The packets may be transmitted to other devices on the network 390 using the network interface 380 (e.g., an Ethernet interface).

At step 610, the packet-generation technique 600 may include the host computing device 302 (e.g., the processor 332 of the host computing device 302) initiating a transmission. Such an initiating of a transmission may be based on one or more steps being performed by an application (e.g., the user application 338 shown and described with reference to FIG. 3).

In response to step 610 occurring, the host computing device 302 (e.g., the processor 332 of the host computing device 302) may perform, simultaneously or in parallel, step 620, step 630, and the transmission of a value corresponding to a length of the payload data 634 to the integrated circuit 350. The value corresponding to the length of the payload data 634 may be contained within a header of a set of data that is processed by the host computing device 302 at step 610 and based on which the transmission is initiated. Further, the value corresponding to the length of the payload data 634 may be transmitted to the integrated circuit 350 over the communication interface 308 (e.g., a PCIe interface).

At step 620, the packet-generation technique 600 may include the host computing device 302 (e.g., the processor 332 of the host computing device 302) pre-calculating a payload portion of a checksum 622 (e.g., a portion of the checksum corresponding to the payload data). The payload portion of the checksum 622 may be generated incrementally as the data is processed/generated (e.g., at step 630). For example, a portion of payload data may be generated and, in response, a portion of the checksum may be pre-calculated at step 620. This may continue, for example, until the entirety of the portion of the checksum corresponding to the payload data is calculated. In response to the pre-calculated portion of the checksum 622 being calculated, the pre-calculated portion of the checksum 622 may be transmitted from the host computing device 302 to the integrated circuit 350 (e.g., over the communication interface 308). In response to the integrated circuit 350 receiving the pre-calculated portion of the checksum 622, the integrated circuit 350 (e.g., executing the network stack logic 356) may initiate step 640 of the packet-generation technique 600.

At step 630, the packet-generation technique 600 may include the host computing device 302 (e.g., the processor 332 of the host computing device 302) processing and/or generating the payload data that is to be transmitted to the integrated circuit 350 and, ultimately, to another device on the network 390 as a network packet. Steps 620 and 630 may happen in parallel. For example, as described above, in response to each portion of the payload data is processed/generated, a corresponding portion of the pre-calculated portion of the checksum 622 may be generated (e.g., at step 620). This may continue until all the payload data is processed/generated and the full pre-calculated portion of the checksum 622 is calculated. Processing/generating the data may include performing operations on data provided at step 610, such as organizing the data, compressing the data, redacting some of the data, etc. such that the data is a proper state for transmission to another device over the network 390 as a network packet. The data provided at step 610 may be from one or more user inputs (e.g., using the user application 338), retrieved from a memory (e.g., a hard drive) within the host computing device 302, retrieved from one or more peripherals associated with the host computing device 302 (e.g., an external memory, such as a USB flash drive or an external hard drive), etc.

As the data is being processed/generated at step 630, portions of payload data 632 to be sent to the network may be produced. These portions of payload data 632 may be transmitted from the host computing device 302 to the integrated circuit 350 incrementally (i.e., as they are produced, rather than in one transmission after all the payload data has been processed/generated). Further, these portions of payload data 632 may be transmitted from the host computing device 302 to the integrated circuit 350 over the communication interface 308. Because the portions of payload data 632 are transmitted incrementally, the portions of payload data 632 may be processed by the integrated circuit 350 in stages. Additionally, transmitting the portions of payload data 632 incrementally allows the host computing device 302 (e.g., a user application 338 of the host computing device 302) to continue processing latter portions of the data while transmitting earlier portions of the data to the integrated circuit 350 for processing. Still further, transmitting the portions of payload data 632 incrementally allows the host computing device 302 (e.g., a user application 338 of the host computing device 302) to interrupt/cancel transmission of the payload data to the integrated circuit 350 (e.g., thereby cancelling the generation/transmission of a network packet to another device on the network 390). This provides further enhancements in situations where a determination is made by the host computing device 302 (e.g., a user application 338 of the host computing device 302) that generating/transmission a network packet is unnecessary and is no longer desired (e.g., and would therefore be computationally wasteful to do so).

In response to receiving the portions of the payload data 632, the integrated circuit 350 (e.g., using the network stack logic 356) may organize these portions of the payload data 632 (e.g., according to an array of address spaces transmitted by the host computing device 302) into a network packet 692. The network packet 692 may include the payload data 632 (e.g., the organized portions of the payload data 632) along with a final packet checksum 694 (e.g., calculated according to TCP or TCP/IP). The final packet checksum 694 may include a header portion of the checksum 642 and the pre-calculated portion of the checksum 622 (e.g., corresponding to a payload portion of the checksum). Further, in some embodiments, these portions of the checksum (e.g., the header portion of the checksum 642 and the pre-calculated portion of the checksum 622) may be combined in a simple additive manner to generate the final packet checksum 694. Additionally, the final packet checksum 694 may be usable by a recipient of the network packet 692 (e.g., a recipient device on the network 390) to identify whether any errors occurred during the transmission of the network packet 692 (e.g., lost bits, inverted bits, etc.).

At step 640, the packet-generation technique 600 may include the integrated circuit 350 (e.g., executing the network stack logic 356) generating the header portion of the checksum 642. The header portion of the checksum 642 may be independent of the payload data 632 (e.g., it may only be based on the TCP, TCP/IP, or the target recipient of the network packet 692 over the network 390). As indicated above, once the header portion of the checksum 642 is generated, it may be combined (e.g., by way of 1's compliment arithmetic) with the pre-calculated portion of the checksum 622 to form the final packet checksum 694. This final packet checksum 964 may then be combined with the payload data 632 to form the network packet 692. Thereafter, the network packet 692 may be transmitted by the integrated circuit 350 to another device on the network 390.

It is understood that steps 620, 630, and 640, as well as the transmissions of the associated values (e.g., the pre-calculated portion of the checksum 622, the payload data 632, and the length of the payload data 634), may be performed substantially simultaneously/in parallel. Further, it is understood that such processes may occur in various orders, each of which being contemplated herein.

Figure 7:
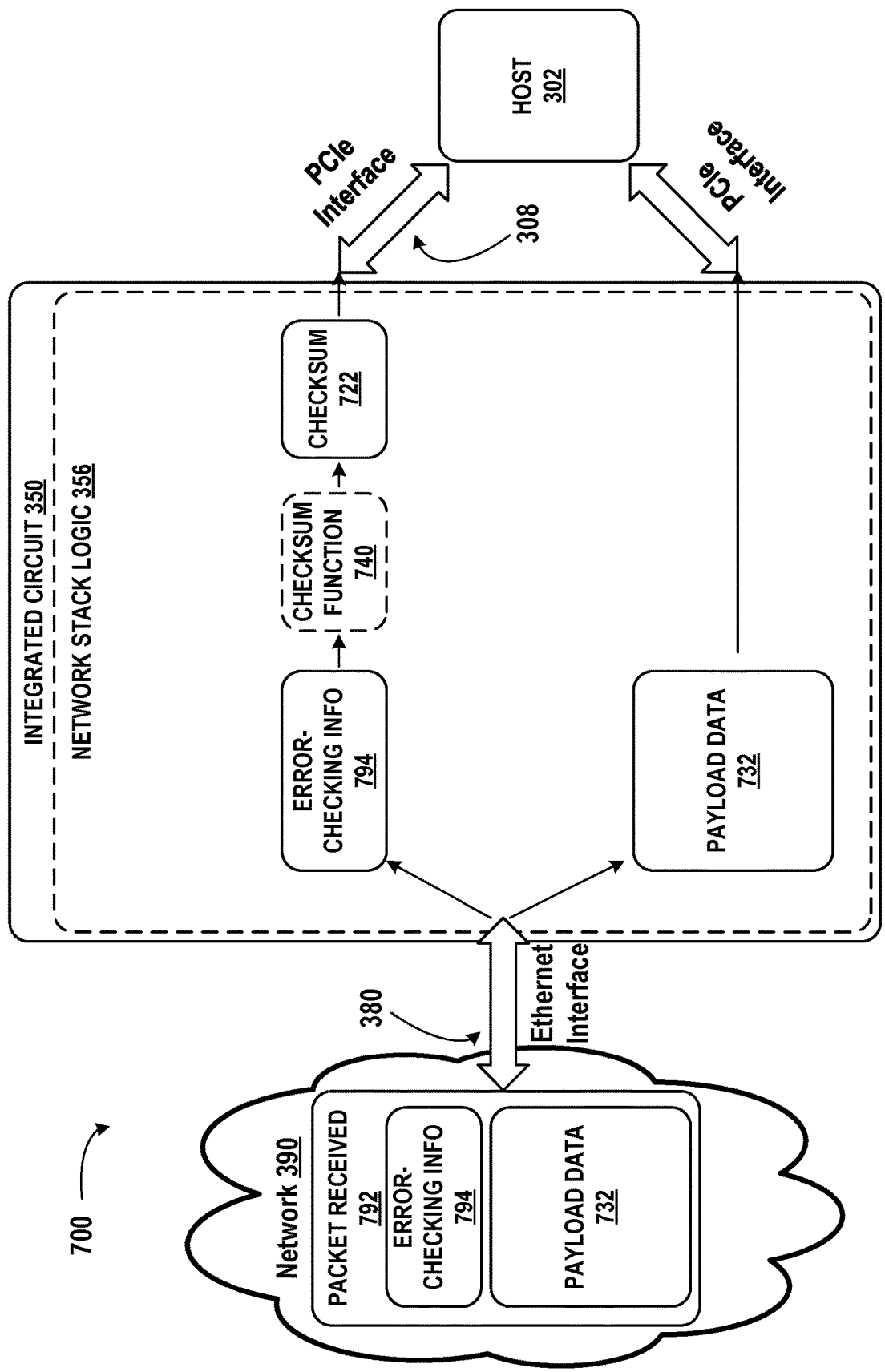
FIG. 7 is a schematic diagram illustrating a de-packetizing technique that can be used when a packet is received, according to example embodiments.

FIG. 7 is a schematic diagram illustrating a de-packetizing technique 700 that can be used when a packet is received (e.g., from another device on the network 390 shown and described with reference to FIG. 3), according to example embodiments. The de-packetizing technique 700 may be used to store payload data 732 contained within a received network packet 792 within a host computing device 302 (e.g., within a memory of the host computing device 302, such as the volatile memory 330 shown and described with reference to FIG. 3). The de-packetizing technique 700 may be performed by the integrated circuit 350 (e.g., the NIC shown and described with reference to FIG. 3) in communication with the host computing device 302 (e.g., over the communication interface 308, such as a PCIe interface) in response to the integrated circuit 350 receiving the network packet 792 that contains error-checking information 794 and the payload data 732 at the network interface 380 (e.g., an Ethernet interface). In addition, the de-packetizing technique 700 may be used in addition to or instead of the asymmetric read/write techniques shown and described with reference to FIGS. 4-5B to improve throughput and/or reduce latency.

When the integrated circuit 350 receives the network packet 792, the integrated circuit 350 (e.g., executing the network stack logic 356 shown and described with reference to FIG. 3) may separate the error-checking information 794 from the payload data 732 and handle each separately (e.g., in parallel and/or simultaneously).

The payload data 732 from the network packet 792 may be transferred to the host computing device 302 (e.g., over the communication interface 308). This transfer may include a writing of the payload data 732 directly to a memory (e.g., the volatile memory 330) of the host computing device 302 using DMA (e.g., as shown and described with reference to FIGS. 4 and 5B).

While the payload data 732 is being transferred from the integrated circuit 350 to the host computing device 302, the integrated circuit 350 (e.g., executing the network stack logic 356 shown and described with reference to FIG. 3) may process the error-checking information 394. At step 740, the de-packetizing technique 700 may include the integrated circuit 350 evaluating a checksum function on the error-checking information 794 to generate a checksum 722. The checksum 722 may be used to determine whether any errors occurred in the transmission of the network packet 792 over the network 390 (e.g., prior to receipt by the integrated circuit 350). In response to evaluating the checksum 722, the checksum 722 may be transmitted to the host computing device 302 (e.g., to the processor 332 of the host computing device 302 over the communication interface 308).

In response to receiving the checksum 722, the host computing device 302 may determine whether any errors occurred in transmission based on the checksum 722. If an error did occur during transmission, one or more portions of the payload data 732 may be corrupted and/or invalid. As such, if the checksum 722 represents an error during transmission, the host computing device 302 may ignore the payload data 732 received and/or delete the payload data 732 from one or more memories of the host computing device 302 (e.g., remove the payload data 732 from the allocated memory addresses within the volatile memory 330 of the host computing device). However, if the host computing device 302 determines based on the checksum 722 that no errors occurred during transmission, the host computing device 302 may access and/or process the payload data 732 (e.g., a user application 338 may make use of the payload data 732 for one or more processes of the user application 338). By transferring the payload data 732 to the host computing device 302 and processing the error-checking information 794 in parallel, the integrated circuit 350 allows the host computing device 302 to make use of the payload data 732 prior to the error-checking information 794 being completely evaluated. Further, these parallel activities also allows the host computing device 302 to make use of the payload data 732 as soon as the checksum 722 is transmitted to the host computing device 302, as opposed to receiving the evaluated checksum 722 and then, thereafter, receiving the payload data 732. Because of this, the de-packetizing technique 700 illustrated in FIG. 7 may further enhance throughput and/or reduce latency.

III. EXAMPLE PROCESSES

Figure 8:
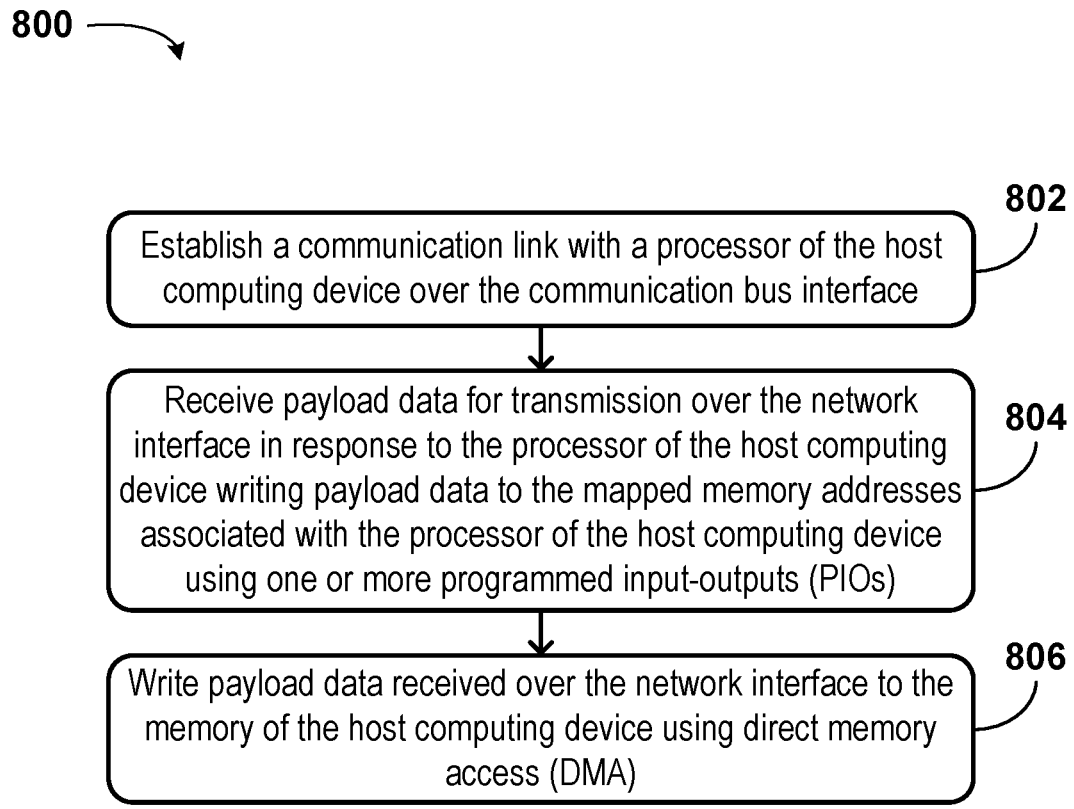
FIG. 8 is a flowchart diagram illustrating a method, according to example embodiments.

FIG. 8 is a flowchart diagram of a method 800, according to example embodiments. The method 800 may be performed by an integrated circuit that includes a network interface and a communication bus interface configured to be connected to a host computing device by way of a communication bus.

At block 802, the method 800 may include establishing a communication link with a processor of the host computing device over the communication bus interface. Establishing the communication link may include mapping address registers of the communication bus interface to memory addresses associated with the processor of the host computing device.

At block 804, the method 800 may include receiving payload data for transmission over the network interface in response to the processor of the host computing device writing payload data to the mapped memory addresses associated with the processor of the host computing device using one or more programmed input-outputs (PIOs).

At block 806, the method 800 may include writing payload data received over the network interface to the memory of the host computing device using direct memory access (DMA). The DMA may include writing the payload data to coherent memory addresses associated with a memory of the host computing device and allocated by the processor of the host computing device.

In some embodiments of the method 800, the communication bus interface may include a peripheral component interconnect express (PCIe) bus.

In some embodiments of the method 800, the network interface may include an Ethernet interface or a WIFI interface.

In some embodiments, the method 800 may include transmitting a transmission packet that includes payload data over the network interface. Additionally or alternatively, the method 800 may include receiving a reception packet that includes payload data over the network interface.

In some embodiments of the method 800, the integrated circuit may include network stack logic. Further, the method 800 may include generating the transmission packet using the network stack logic.

In some embodiments of the method 800, generating the transmission packet may include receiving a payload portion of a transmission control protocol (TCP) checksum associated with payload data to be transmitted over the network interface. The payload portion of the TCP checksum may be calculated by the host computing device and transmitted to the integrated circuit over the communication link. The method 800 may also include calculating a header portion of the TCP checksum. The header portion of the TCP checksum may be calculated while receiving payload data to be transmitted over the network interface over the communication link. Further, the method 800 may include combining the header portion of the TCP checksum and the payload portion of the TCP checksum to form the TCP checksum. Additionally, the method 800 may include combining the TCP checksum and payload data to form the transmission packet.

In some embodiments of the method 800, the integrated circuit may include network stack logic. Further, the method 800 may include de-packetizing the reception packet using the network stack logic.

In some embodiments of the method 800, de-packetizing the reception packet may include separating error-checking information from payload data. Further, according to the network stack logic, the method 800 may include calculating a checksum based on the error-checking information while in parallel writing payload data to the memory of the host computing device using the DMA.

In some embodiments of the method 800, the integrated circuit may include a field-programmable gate array (FPGA).

In some embodiments of the method 800, receiving payload data for transmission over the network interface may include receiving payload data according to a ring-buffer structure according to an array of address spaces determined by the processor of the host computing device. Each of the address spaces may include metadata and a portion of payload data.

In some embodiments of the method 800, the metadata associated with the address spaces may describe an ordered arrangement of the portions of payload data. Further, in some embodiments, the method 800 may include reordering the portions of payload data, when necessary, into the ordered arrangement based on the metadata.

Figure 9:
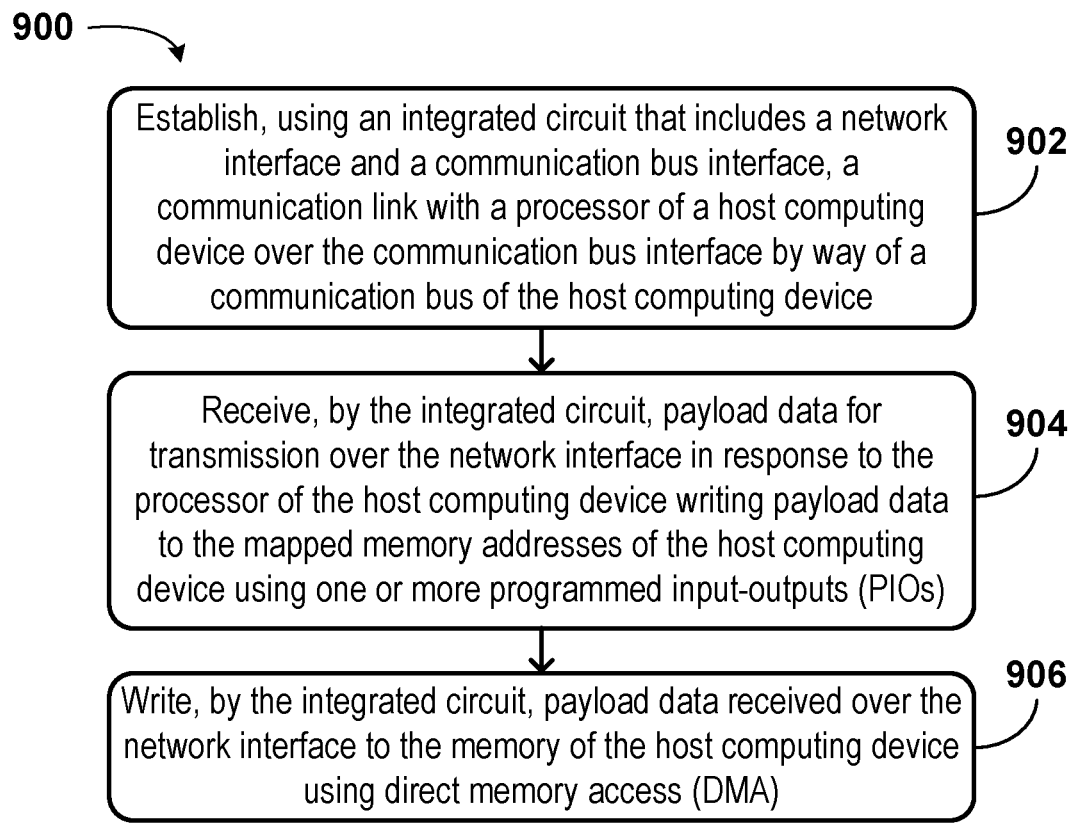
FIG. 9 is a flowchart diagram illustrating a method, according to example embodiments.

FIG. 9 is a flowchart diagram of a method 900, according to example embodiments. In some embodiments, the method 900 may be performed by the integrated circuit 350 shown and described with reference to FIG. 3 and the host computing device 302 shown and described with reference to FIG. 3.

At block 902, the method 900 may include establishing, using an integrated circuit that includes a network interface and a communication bus interface, a communication link with a processor of a host computing device over the communication bus interface by way of a communication bus of the host computing device. Establishing the communication link may include mapping address registers of the communication bus interface to memory addresses associated with the processor of the host computing device.

At block 904, the method 900 may include receiving, by the integrated circuit, payload data for transmission over the network interface in response to the processor of the host computing device writing payload data to the mapped memory addresses of the host computing device using one or more programmed input-outputs (PIOs).

At block 906, the method 900 may include writing, by the integrated circuit, payload data received over the network interface to the memory of the host computing device using direct memory access (DMA). The DMA may include writing the payload data to coherent memory addresses associated a memory of the host computing device and allocated by the processor of the host computing device.

Figure 10:
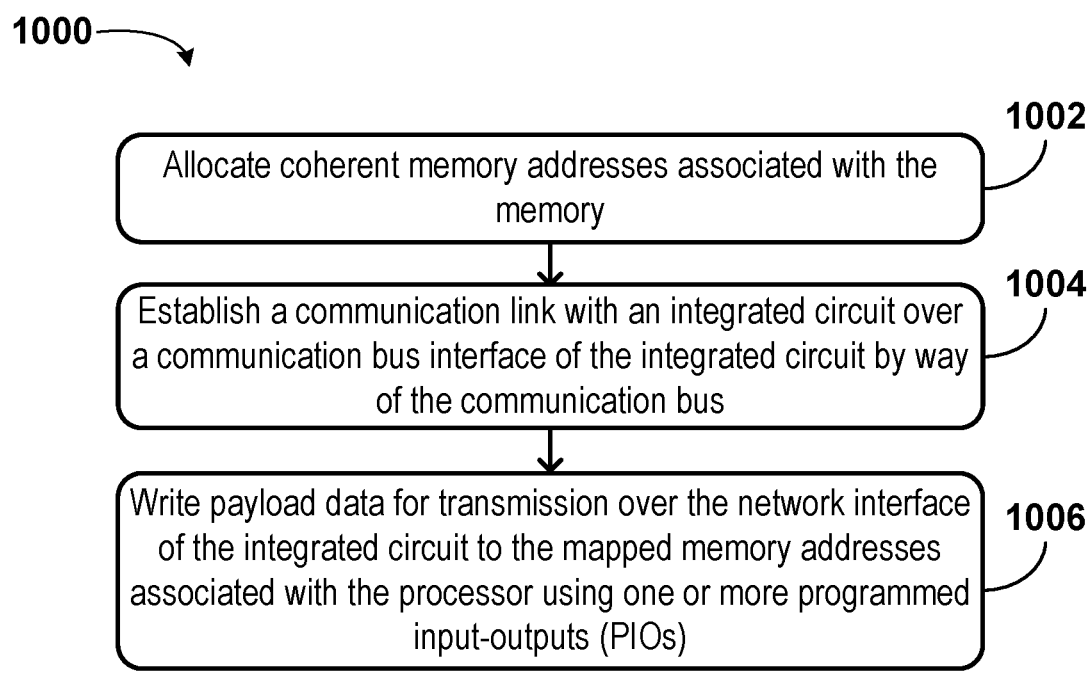
FIG. 10 is a flowchart diagram illustrating a method, according to example embodiments.

FIG. 10 is a flowchart diagram of a method 1000, according to example embodiments. In some embodiments, the method 1000 may be performed by a processor executing instructions stored in a non-transitory, computer-readable medium. The processor may be a component of a computing device (e.g., the host computing device 302 shown and described with reference to FIG. 3). The computing device may also include a memory and a communication bus.

At block 1002, the method 1000 may include allocating coherent memory addresses associated with the memory.

At block 1004, the method 1000 may include establishing a communication link with an integrated circuit over a communication bus interface of the integrated circuit by way of the communication bus. Establishing the communication link may include mapping address registers of the communication bus interface to memory addresses associated with the process. Establishing the communication link may permit the integrated circuit to write payload data received over a network interface of the integrated circuit to the memory using direct memory access (DMA) by writing the payload data to the allocated coherent memory addresses.

At block 1006, the method 1000 may include writing payload data for transmission over the network interface of the integrated circuit to the mapped memory addresses associated with the processor using one or more programmed input-outputs (PIOs).

In some embodiments of the method 1000, the instructions stored in the non-transitory, computer-readable medium may include a driver corresponding to the integrated circuit.

In some embodiments of the method 1000, the coherent memory addresses associated with the memory may be allocated using the driver corresponding to the integrated circuit.

In some embodiments, the method 1000 may further include periodically polling a first memory address of the allocated coherent memory addresses associated with the memory to determine whether the first memory address has been written to by the integrated circuit.

In some embodiments, the method 1000 may further include, in response to determining that the first memory address has been written to by the integrated circuit, reading and processing data stored within memory addresses of the allocated coherent memory addresses that are subsequent to the first memory address.

In some embodiments of the method 1000, reading and processing data stored within memory addresses of the allocated coherent memory addresses that are subsequent to the first memory address may include reading from the subsequent memory addresses using a fixed-size buffer or using a variable-sized buffer that is sized based on metadata stored within the first memory address.

In some embodiments of the method 1000, mapping address registers of the communication bus interface to memory addresses associated with the processor may include setting a write-combining flag. Further, writing the payload data for transmission over the network interface of the integrated circuit from the memory to the mapped memory addresses associated with the processor using the one or more PIOs may include writing the payload data for transmission over the network interface of the integrated circuit to a write combining buffer.

In some embodiments of the method 1000, the one or more PIOs may include one or more processor supplementary instructions from a processor supplementary instruction set.

IV. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

The computer-readable medium can also include non-transitory computer-readable media such as computer-readable media that store data for short periods of time like register memory and processor cache. The computer-readable media can further include non-transitory computer-readable media that store program code and/or data for longer periods of time. Thus, the computer-readable media may include secondary or persistent long term storage, like ROM, optical or magnetic disks, solid state drives, compact-disc read only memory (CD-ROM), for example. The computer-readable media can also be any other volatile or non-volatile storage systems. A computer-readable medium can be considered a computer-readable storage medium, for example, or a tangible storage device.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed:

1. An integrated circuit comprising:
a network interface; and
a communication bus interface configured to be connected to a host computing device by way of a communication bus, wherein the integrated circuit is configured to:
establish a communication link with a processor of the host computing device over the communication bus interface, wherein establishing the communication link comprises mapping address registers of the communication bus interface to memory addresses associated with the processor of the host computing device;
receive payload data for transmission over the network interface in response to determining the processor of the host computing device writing payload data to the mapped memory addresses associated with the processor of the host computing device using one or more programmed input-outputs (PIOs); and
write payload data received over the network interface to a memory of the host computing device using direct memory access (DMA), wherein the DMA comprises writing the payload data to coherent memory addresses associated with the memory of the host computing device and allocated by the processor of the host computing device, wherein a first memory address of the coherent memory addresses allocated by the processor of the host computing device is periodically polled by the processor of the host computing device to determine whether the first memory address has been written to by the integrated circuit, and wherein, in response to the processor of the host computing device determining that the first memory address has been written to by the integrated circuit, data stored within memory addresses of the allocated coherent memory addresses that are subsequent to the first memory address is read and processed by the processor of the host computing device.

2. The integrated circuit of claim 1, wherein the communication bus interface comprises a peripheral component interconnect express (PCIe) bus.

3. The integrated circuit of claim 1, wherein the network interface comprises an Ethernet interface or a WIFI interface.

4. The integrated circuit of claim 1, wherein the integrated circuit is further configured to:
transmit a transmission packet comprising payload data over the network interface; and
receive a reception packet comprising payload data over the network interface.

5. The integrated circuit of claim 4, further comprising network stack logic, wherein the integrated circuit is further configured to generate the transmission packet using the network stack logic.

6. The integrated circuit of claim 5, wherein generating the transmission packet comprises:
receiving a payload portion of a transmission control protocol (TCP) checksum associated with payload data to be transmitted over the network interface, wherein the payload portion of the TCP checksum was calculated by the host computing device and transmitted to the integrated circuit over the communication link;
calculating a header portion of the TCP checksum, wherein the header portion of the TCP checksum is calculated while receiving payload data to be transmitted over the network interface over the communication link;
combining the header portion of the TCP checksum and the payload portion of the TCP checksum to form the TCP checksum; and
combining the TCP checksum and payload data to form the transmission packet.

7. The integrated circuit of claim 4, further comprising network stack logic, wherein the integrated circuit is further configured to de-packetize the reception packet using the network stack logic.

8. The integrated circuit of claim 7, wherein de-packetizing the reception packet comprises separating error-checking information from payload data, and wherein, according to the network stack logic, the integrated circuit is further configured to calculate a checksum based on the error-checking information while in parallel writing payload data to the memory of the host computing device using the DMA.

9. The integrated circuit of claim 1, wherein the integrated circuit comprises a field-programmable gate array (FPGA).

10. The integrated circuit of claim 1, wherein receiving payload data for transmission over the network interface comprises receiving payload data according to a ring-buffer structure according to an array of address spaces determined by the processor of the host computing device, and wherein each of the address spaces comprises metadata and a portion of payload data.

11. The integrated circuit of claim 10, wherein the metadata associated with the address spaces describes an ordered arrangement of the portions of payload data, and wherein the integrated circuit is further configured to reorder the portions of payload data, when necessary, into the ordered arrangement based on the metadata.

12. A method comprising:
  establishing, using an integrated circuit that comprises a network interface and a communication bus interface, a communication link with a processor of a host computing device over the communication bus interface by way of a communication bus of the host computing device, wherein establishing the communication link comprises mapping address registers of the communication bus interface to memory addresses associated with the processor of the host computing device;
  receiving, by the integrated circuit, payload data for transmission over the network interface in response to determining the processor of the host computing device writing payload data to the mapped memory addresses of the host computing device using one or more programmed input-outputs (PIOs); and
  writing, by the integrated circuit, payload data received over the network interface to a memory of the host computing device using direct memory access (DMA), wherein the DMA comprises writing the payload data to coherent memory addresses associated with the memory of the host computing device and allocated by the processor of the host computing device, wherein a first memory address of the coherent memory addresses allocated by the processor of the host computing device is periodically polled by the processor of the host computing device to determine whether the first memory address has been written to by the integrated circuit, and wherein, in response to the processor of the host computing device determining that the first memory address has been written to by the integrated circuit, data stored within memory addresses of the allocated coherent memory addresses that are subsequent to the first memory address is read and processed by the processor of the host computing device.

13. A computing device comprising:
  a memory;
  a communication bus; and
  a processor configured to execute instructions stored in a non-transitory, computer-readable medium to:
    allocate coherent memory addresses associated with the memory;
    establish a communication link with an integrated circuit over a communication bus interface of the integrated circuit by way of the communication bus, wherein establishing the communication link comprises mapping address registers of the communication bus interface to memory addresses associated with the processor, and wherein establishing the communication link permits the integrated circuit to write payload data received over a network interface of the integrated circuit to the memory using direct memory access (DMA) by writing the payload data to the allocated coherent memory addresses;
    write payload data for transmission over the network interface of the integrated circuit to the mapped memory addresses associated with the processor using one or more programmed input-outputs (PIOs);
    periodically poll a first memory address of the allocated coherent memory addresses associated with the memory to determine whether the first memory address has been written to by the integrated circuit; and
    in response to determining that the first memory address has been written to by the integrated circuit, read and process data stored within memory addresses of the allocated coherent memory addresses that are subsequent to the first memory address.

14. The computing device of claim 13, wherein the instructions stored in the non-transitory, computer-readable medium comprise a driver corresponding to the integrated circuit.

15. The computing device of claim 14, wherein the coherent memory addresses associated with the memory are allocated using the driver corresponding to the integrated circuit.

16. The computing device of claim 13, wherein reading and processing data stored within memory addresses of the allocated coherent memory addresses that are subsequent to the first memory address comprises reading from the subsequent memory addresses using a fixed-size buffer or using a variable-sized buffer that is sized based on metadata stored within the first memory address.

17. The computing device of claim 13, wherein mapping address registers of the communication bus interface to memory addresses associated with the processor comprises setting a write-combining flag, and wherein writing the payload data for transmission over the network interface of the integrated circuit from the memory to the mapped memory addresses associated with the processor using the one or more PIOs comprises writing the payload data for transmission over the network interface of the integrated circuit to a write combining buffer.

18. The computing device of claim 13, wherein the one or more PIOs comprise one or more processor supplementary instructions from a processor supplementary instruction set.

* * * * *